(12) United States Patent
Klitsner et al.

(10) Patent No.: US 7,676,584 B2
(45) Date of Patent: Mar. 9, 2010

(54) METHOD AND APPARATUS FOR PROVIDING GAMES AND CONTENT

(75) Inventors: Dan Klitsner, Larkspur, CA (US); Gary Levenberg, San Francisco, CA (US); Brian Clemens, San Francisco, CA (US); Joe Forest, Amesbury, MA (US)

(73) Assignee: Kid Group LLC, San Francisco, CA (US)

( * ) Notice: Subject to any disclaimer, the term of this patent is extended or adjusted under 35 U.S.C. 154(b) by 388 days.

(21) Appl. No.: 11/709,593

(22) Filed: Feb. 21, 2007

(65) Prior Publication Data

US 2007/0155204 A1 Jul. 5, 2007

Related U.S. Application Data

(63) Continuation-in-part of application No. 11/360,170, filed on Feb. 22, 2006.

(60) Provisional application No. 60/682,183, filed on May 17, 2005.

(51) Int. Cl.
*H01R 13/44* (2006.01)
(52) U.S. Cl. .................................... 709/227
(58) Field of Classification Search .................. 709/227
See application file for complete search history.

(56) References Cited

U.S. PATENT DOCUMENTS

| | | | | |
|---|---|---|---|---|
| 5,533,124 A | 7/1996 | Smith et al. | ...................... | 380/4 |
| 5,666,320 A * | 9/1997 | Wong et al. | .................. | 365/207 |
| 5,778,384 A | 7/1998 | Provino et al. | .............. | 707/200 |
| 5,835,732 A | 11/1998 | Kikinis et al. | ................ | 395/281 |
| 6,101,534 A | 8/2000 | Rothschild | ................... | 709/217 |
| 6,434,648 B1 * | 8/2002 | Assour et al. | ................ | 710/305 |
| 6,487,597 B1 | 11/2002 | Horie et al. | .................. | 709/227 |
| 6,516,416 B2 | 2/2003 | Gregg et al. | ................. | 713/201 |
| 6,522,534 B1 | 2/2003 | Wu | ............................ | 361/686 |
| 6,688,973 B2 | 2/2004 | Satloff et al. | .................... | 463/1 |
| 6,697,944 B1 | 2/2004 | Jones et al. | .................. | 713/168 |
| 6,704,824 B1 | 3/2004 | Goodman | .................... | 710/300 |
| 6,716,102 B2 | 4/2004 | Whitten et al. | ................. | 463/43 |
| 6,733,329 B2 | 5/2004 | Yang | .......................... | 439/518 |

(Continued)

FOREIGN PATENT DOCUMENTS

WO    WO 02/093468 A1    11/2002

OTHER PUBLICATIONS

Non-Final Office Action dated Oct. 14, 2009, U.S. Appl. No. 11/360,170, filed Feb. 22, 2006, Dan Klitsner.

*Primary Examiner*—Wing F Chan
*Assistant Examiner*—Tesfay Yohannes
(74) *Attorney, Agent, or Firm*—Haverstock & Owens LLP

(57) ABSTRACT

In an embodiment of the invention, a dongle is configured for communication with an electronic device. The dongle includes a connector, a controller, a first memory and a second memory. The connector is for interfacing with the electronic device. The controller is for controlling the interface between the connector and the electronic device. The first memory includes a file system. The controller is configured to provide automatic recognition of the dongle and mounting of the file system to the electronic device by using the connector when the dongle interfaces with the electronic device. The second memory has data for automatic navigation to a predetermined location. The dongle is configured for automatic execution of an element of the file system.

31 Claims, 24 Drawing Sheets

U.S. PATENT DOCUMENTS

| | | |
|---|---|---|
| 6,748,541 B1 | 6/2004 | Margalit et al. ............. 713/201 |
| 6,799,226 B1 | 9/2004 | Robbin et al. ................. 710/15 |
| 6,880,054 B2 | 4/2005 | Cheng et al. ................ 711/164 |
| 6,898,653 B2 | 5/2005 | Su et al. ..................... 710/302 |
| 6,920,500 B2 | 7/2005 | Surloff et al. ............... 709/227 |
| 6,947,332 B2* | 9/2005 | Wallace et al. ......... 365/185.33 |
| 6,959,362 B2 | 10/2005 | Wall et al. ................... 711/130 |
| 6,959,860 B2 | 11/2005 | Hendrick .................... 235/380 |
| 6,986,030 B2 | 1/2006 | Shmueli ........................ 713/1 |
| 7,106,609 B2* | 9/2006 | Wallace et al. ................ 365/52 |
| 7,366,551 B1* | 4/2008 | Hartley .................... 455/575.1 |
| 7,370,166 B1* | 5/2008 | Ramesh et al. ............. 711/163 |
| 2002/0095501 A1 | 7/2002 | Chiloyan et al. ............ 709/227 |
| 2002/0108052 A1* | 8/2002 | Maruyama ................... 713/193 |
| 2004/0073787 A1 | 4/2004 | Ban et al. .................... 713/159 |
| 2004/0127254 A1 | 7/2004 | Chang |
| 2005/0042930 A1 | 2/2005 | Harkabi et al. .............. 439/660 |
| 2005/0109841 A1 | 5/2005 | Ryan et al. .................. 235/380 |
| 2005/0114300 A1* | 5/2005 | Khalid et al. .................. 707/2 |
| 2005/0114643 A1 | 5/2005 | Bryant-Rich et al. ........... 713/1 |
| 2006/0031752 A1 | 2/2006 | Surloff et al. ............. 715/501.1 |
| 2006/0107317 A1 | 5/2006 | Moran et al. .................. 726/21 |
| 2006/0205515 A1 | 9/2006 | Cockerille et al. ............ 463/43 |
| 2006/0208066 A1 | 9/2006 | Finn et al. |
| 2006/0287110 A1 | 12/2006 | Klitsner et al. ................ 463/44 |
| 2008/0123669 A1* | 5/2008 | Oliveti et al. ............... 370/401 |

* cited by examiner

METHOD AND APPARATUS FOR PROVIDING GAMES AND CONTENT

RELATED APPLICATIONS

This patent application is a continuation in part of the co-pending U.S. patent application Ser. No. 11/360,170, filed Feb. 22, 2006, entitled "METHOD AND APPARATUS FOR PROVIDING GAMES AND CONTENT," which is hereby incorporated by reference.

The U.S. patent application Ser. No. 11/360,170 claims priority under 35 U.S.C. §119(e) of the U.S. Provisional Patent Application Ser. No. 60/682,183, filed May 17, 2005, entitled "PC PLUG N PLAY," which is also hereby incorporated by reference.

FIELD OF THE INVENTION

The present invention relates to the field of electronic games and content. More particularly, the present invention relates to method and apparatus for providing games and content.

BACKGROUND

A new area of electronic games is the television plug and play product. These are games contained in a single-use handheld controller that a user simply plugs into a TV to play. In 2005, $550 million was spent on television plug and play products through retail purchases.

At the same time, online activities have increased over the past several years. These online activities, requiring only a computer and an internet connection, include online gaming, communities, trading, downloading media and subscription activities. The gaming portion alone is a large portion of the revenue generated by companies that foster these activities.

However, to participate in an online activity associated with network games, or with online community content in general, a player must typically connect their PC to the online network and provide some very personal and/or financial information. This has created barriers for those consumers who are either (1) technically challenged or techno phobic such that finding and navigating the desired content is sufficiently discouraging of participation, or (2) are concerned about privacy and unwilling to enter personal identifying and/or financial information. Some online access requirements are quite invasive and require name, address, telephone number(s), email address(es), and/or credit card information.

What is needed is a simple, secure and inexpensive means from a retail store to connect with the online experience.

SUMMARY OF THE DISCLOSURE

In an embodiment of the invention, an apparatus is configured for communication with an electronic device. The apparatus will be referred to hereinafter as a so called "dongle." The dongle includes a connector, a controller, a first memory and a second memory. The connector is for interfacing with the electronic device. The controller is for controlling the interface between the connector and the electronic device. The first memory includes a file system. The controller is configured to provide automatic recognition of the dongle and mounting of the file system to the electronic device by using the connector when the dongle interfaces with the electronic device. The second memory has data for automatic navigation to a predetermined location. The dongle is configured for automatic execution of an element of the file system.

Preferably, the contents of the second memory are hidden from an operating system of the electronic device such that the contents are only accessible through the controller. The controller of some embodiments permits a write operation to one or more of the memories of the dongle, while the controller of some embodiments denies a write operation to one or more of the memories. The data in the second memory often comprises a link to a remote location. Preferably, the second memory further includes a security code for automated authentication of the dongle. The dongle of these embodiments provides authorization for accessing secured information by using a unique identifier.

The dongle in certain implementations is configured to emulate a device type other than an actual device type such that the dongle is mounted as the different device type. For instance, some dongles are configured to emulate a compact disc (CD) device type. In these embodiments, the electronic device includes an operating system that is configured for autorun capability. The first memory of these embodiments typically contains an information file that specifies the element of the file system for automatic execution.

In some embodiments, the connector is a universal serial bus (USB) type connector, the first memory comprises read only memory (ROM), and the second memory comprises random access memory (RAM). The electronic device is typically a personal computer, a server, a personal digital assistant, a cellular telephone, or a game station.

Some embodiments further include a first locus and a second locus for the memories. For instance, the first memory is positioned by using the first locus, and/or the second memory is positioned by using the second locus. In some of these cases, the second memory is a removable EEPROM, and the second locus preferably includes a socket for the removable EEPROM such that the second memory is removable from the second locus.

Typically, the second memory provides a functionality for the dongle and preferably has several different or alternative configurations. In this implementation, each configuration has a separate user selectable functionality. As such, when the second memory is alternately configured or replaced by using an alternate configuration for the second memory, an alternate functionality is selected.

For instance, the second memory of some embodiments has data for automatic navigation to a predetermined location and/or for authentication. In some of these embodiments, an alternate or additional memory provides for navigation and/or authentication for a different location and/or content. Some embodiments further prevent navigation to another location other than the predetermined location(s).

In some embodiments, the electronic device is configured to receive a remote program from the predetermined location. In some of these embodiments, the electronic device has a registry, and the dongle is configured to check the registry. The registry is configured to indicate whether the remote program is received. The dongle of these cases is further configured for a first launch and a second launch. The first launch occurs when the dongle is initially coupled to the electronic device. The second launch is subsequent to the first launch and is preferably faster than the first launch. In some instances, when the dongle is decoupled from the electronic device, a functionality is disabled.

The dongle of some embodiments further includes a third memory and/or a third locus. The third memory is configured to provide an additional selectable functionality. Preferably, the third locus comprises a socket. In this implementation, the third memory is positioned within the third locus such that it is removable from the third locus.

Some embodiments of the invention provide a method of interfacing with an electronic device. The method couples to the electronic device by using a connector and controls the interface between the connector and the electronic device. The method retrieves from a first memory a stored file system and provides the retrieved file system to the electronic device by using the connector. The method automatically recognizes the file system when the connector interfaces with the electronic device, automatically executes an element of the file system, and uses data from a second memory. The contents of the second memory are often hidden from an operating system of the electronic device such that the contents are only accessible through the step of controlling the interface between the connector and the electronic device. The data typically comprises a link to a remote location. The second memory of some of these embodiments further includes a security code for automated authentication. The method optionally further provides authorization for accessing secured information, often, by using a unique identifier. In another embodiment of the invention, the second memory is a micro controller.

In some embodiments of the invention, the method provides a functionality by using the second memory. In these embodiments, the second memory preferably has several optional configurations. Each configuration has a separate user selectable functionality. When the second memory is alternately configured or replaced by using an alternate configuration for the second memory, an alternate functionality is selected. The method optionally further provides an additional functionality by using a third memory and selects an alternative functionality by configuring and/or replacing the third memory.

Some embodiments provide a method of emulating a different device type other than an actual device type when the connector interfaces with the electronic device, while some embodiments determine a condition when the connector is disconnected and disables a functionality in response thereto. A particular embodiment retrieves a set of predetermined locations and prevents navigation to a location that is not within the set.

From a specific and/or predetermined location, the method retrieves a remote program and stores the program on the electronic device such that a second launch is faster than the first launch. In this implementation, the method typically includes a step that determines whether a remote program is downloaded, and a step that runs the remote program.

In an additional embodiment of the invention, a system for providing content includes an electronic device for receiving the content. The system has a source location that has a unique address and that contains the content. The system also has a security code for authenticating access to the source location and a dongle that stores the security code. The dongle is configured to provide the security code to the source location when the dongle is coupled to the electronic device such that the source location provides the content to the electronic device. In some embodiments, the dongle is mounted by an operating system of the electronic device as a writeable removable storage medium, while some embodiments mount the dongle as a read only removable storage medium. In a particular embodiment of the invention, the dongle is mounted on an operating system of the electronic device as a compact disc (CD) type removable storage medium only. In another embodiment of the invention, the dongle is mounted on an operating system of the electronic device as a fixed disk drive.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

I. Introduction and Apparatus

In contrast to the online games and the methods by which consumers join and participate in online activities such as the online communities described above, embodiments of the invention provide a method and means for accessing content, particularly related to an online community, without the need for sophisticated navigation and/or without requiring personal and financial data. Accordingly, some embodiments provide for content distribution, such as game distribution, in an alternative hardware/software format. For example, some of these embodiments include a physical means that is purchased anonymously just as any retail item and, further, that plugs directly into a personal computer or other suitable electronic device to provide navigation and/or access. A particular embodiment accomplishes the features described above through a dongle that provides the automatic navigation, execution, and/or secure access capabilities.

Figure 1:
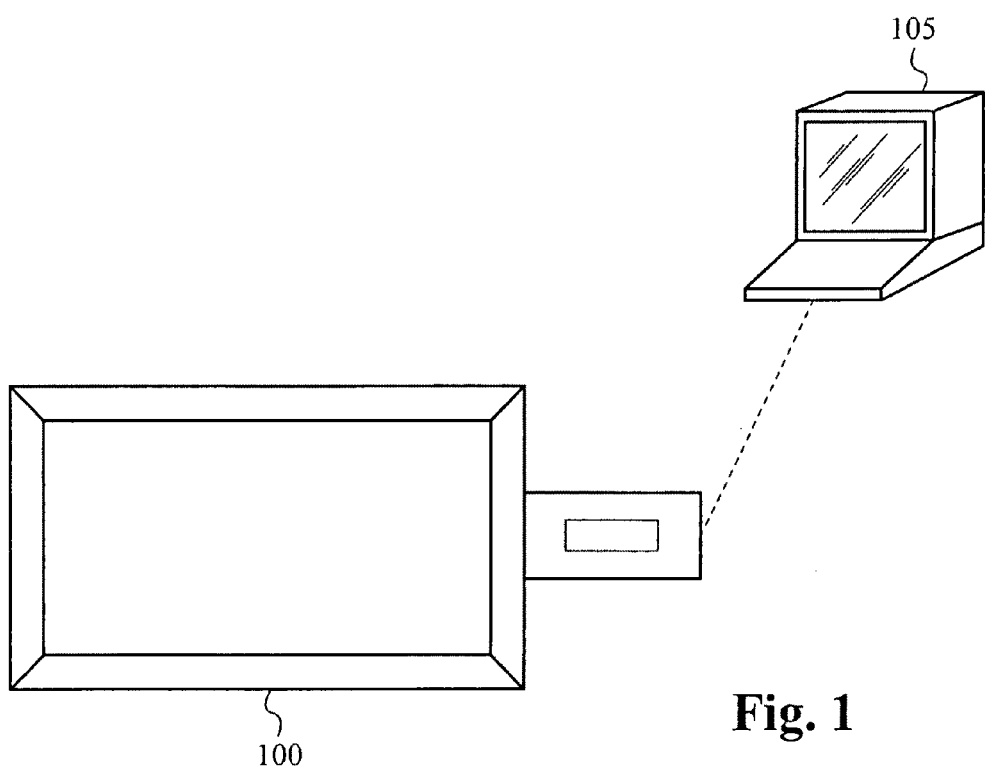
FIG. 1 illustrates a dongle that is connected with an electronic device according to some embodiments of the invention.

For instance, FIG. 1 illustrates an apparatus or "dongle" 100 that is coupled with an electronic device 105 according to some embodiments of the invention. As shown in this figure, the electronic device 105 is typically a personal computer that is configured with a port for coupling the dongle 100. The dongle typically couples through the USB port of a personal computer. However, one of ordinary skill will recognize the other forms of coupling such as USB 2.0, Firewire, iLINK, or any number of other direct contact, wired, and/or wireless means of connectivity. The embodiment illustrated in FIG. 1 provides for the automated navigation and/or authentication for access to content that is stored locally on the dongle 100 and/or the electronic device 105. Alternatively, or in conjunction with the embodiment illustrated in FIG. 1, some embodiments provide for joining and participating in online or networked activities. An example of these embodiments is illustrated in FIG. 2.

Figure 2:
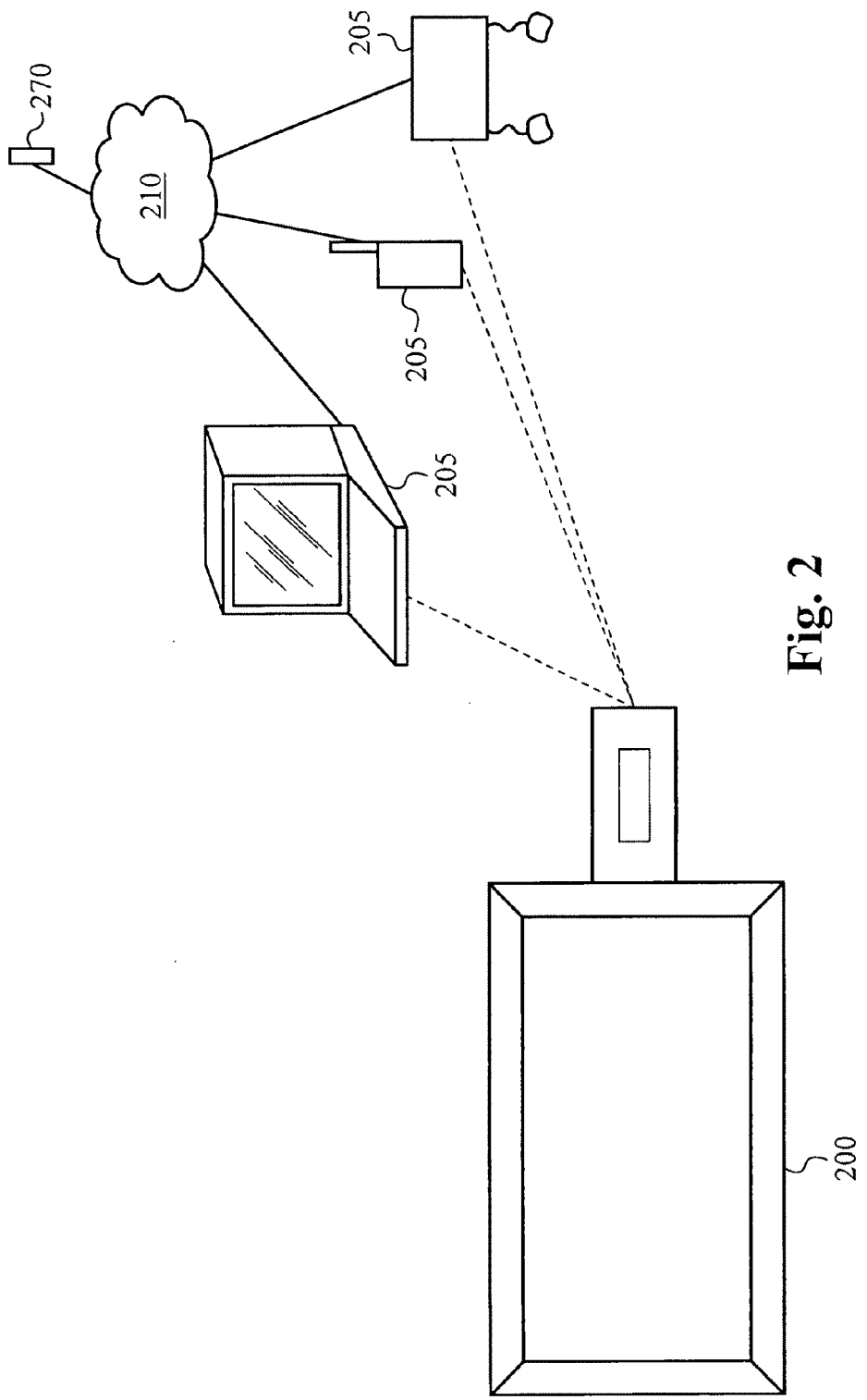
FIG. 2 illustrates a dongle that connects with any number of networked devices in accordance with some embodiments of the invention.

As shown in FIG. 2, the dongle 200 additionally couples with any number of network devices 205 that are connected to a network 210. Examples of the networked devices 205 include, but are not limited to, personal computers, laptop or notebook computers, servers, personal digital assistants, game consoles or stations, and cellular telephones. The network 210 includes a local area network (LAN), a wide area network (WAN), a virtual private network (VPN), an intranet, and extranet, and/or a network of networks such as the Internet, for example. The network 210 includes one or more content sources that are typically in the form of a remote server 270.

The dongle of some embodiments emulates a removable storage drive when connected to the electronic device, such as, for example the CD-ROM drive on a personal computer. In some instances, the electronic device configures operating system support for the dongle as both a compact disc (CD) and as another type of removable storage drive. In a particular embodiment, an operating system running on the electronic device recognizes the dongle as only a CD type medium. In these embodiments, the dongle is typically coupled to the personal computer through a USB port. However, as mentioned above, one of ordinary skill will recognize other forms of connection. For the sake of clarity, an exemplary USB type dongle will be described in further detail below.

Figure 3:
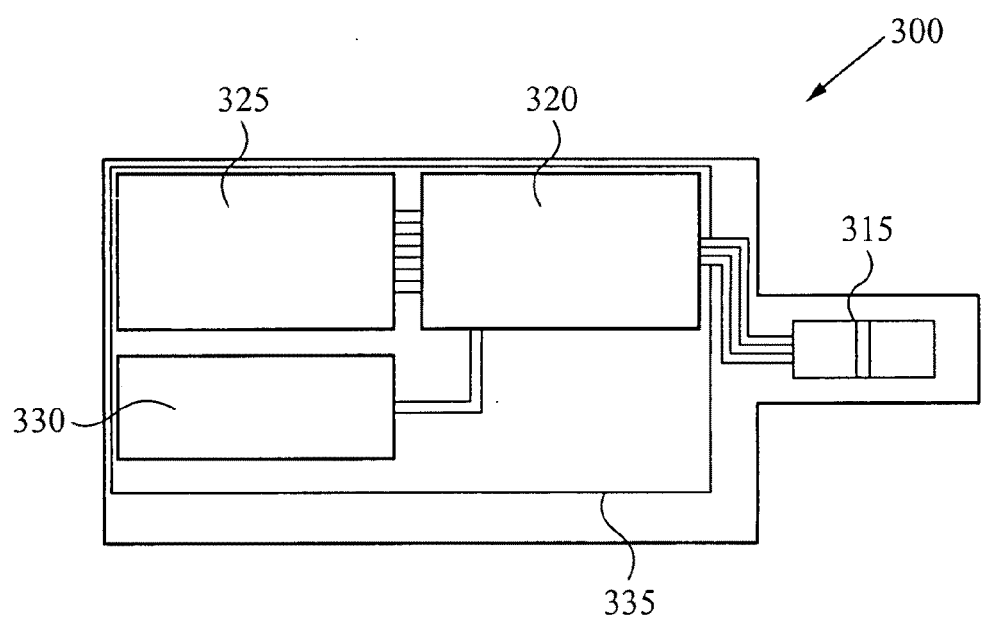
FIG. 3 illustrates the dongle of some embodiments in greater detail.

Specifically, FIG. 3 illustrates the dongle of some embodiments in greater detail. As shown in this figure, the dongle 300 includes a connector 315, a controller 320, and two memories 325 and 330, that are interconnected. As mentioned above, the connector 315 is configured for connectivity to any number of ports for electronic devices such as the USB connector illustrated in this embodiment.

The controller 320 controls data transmission between the connector 315 and the other components of the dongle 300 such as the memories 325 and 330. The controller is typically specifically suited to control the particular functions of the type of connector 315, such as setup and/or configuration of the connection, mounting, and/or data transmission with the connected electronic device.

The first memory 325, typically stores a file system in a non volatile fashion. For instance, the memory 325 of some embodiments is a read only memory (ROM) that stores a Windows® compatible file system such as ISO CD Format, CDFS or the file allocation table (FAT®) file system. Both Windows and FAT are provided by the Microsoft corporation. The ROM can be implemented as a mask programmable ROM, a programmable ROM (PROM), an erasable PROM (EPROM), an electrically erasable EPROM (EEPROM) or a flash memory. For simplicity of discussion, all these types of devices will hereafter be described only as ROMs. However, additional storage means and file systems are recognized by those of ordinary skill and are contemplated in alternative embodiments. Thus, the first memory 325 (the ROM) typically contains a file system that is readable by the electronic device. The file system of these embodiments typically further contains additional elements that provide for the automatic recognition of the file system and/or the dongle. Additionally, some embodiments provide for the automatic execution of certain scripts, applications, and/or programs that are stored in the memories 325 and 330 of the dongle.

For instance, the ROM of some embodiments further includes three small files: an information file autorun.inf, a startup application, and an icon file. The information file autorun.inf of these embodiments typically specifies the startup application and the icon to be used on the desktop of the host operating system. The icon file is used to display predetermined iconic information when the dongle is connected to the electronic device. Specifically, the icon file of some embodiments contains a bit map image of the icon for display when the device is mounted on the desktop of an electronic device running a Windows type operating system.

Similarly, the autorun.inf file and startup application are used to automatically perform a predetermined task or program upon connection of the dongle. The startup application typically first confirms the presence of a connection, and then automatically executes a desired function, which often includes obtaining additional information from the second memory 330. Mounting and the autorun.inf file are discussed further in Section II, while an exemplary startup application is described in Section III.

The autorun.inf and icon file are often very small, on the order of less than 1 KB, for example. The startup application is locally stored or contains a function call to an externally stored application. Whether locally stored or merely containing a call to an externally stored procedure, the startup application is often smaller than 256 KB. For a typical 512 KB ROM chip, about 256 KB remain for use by the controller 320 and components of the dongle to emulate a traditional mass storage device containing the three small files (autorun.inf, icon, startup application). For instance, the dongle of some embodiments emulates a CD (including CD-ROM, CD-R, CD-RW, and other read, read only, and read/write formats) when connected to an electronic device that supports such media, such as a personal computer. The emulation of a traditional mass storage device in the form of a CD has particular advantages for automatic mounting of the dongle and the execution of data, including executable data, stored on the connected electronic device. These advantages will be described further in Section 11.

Also, the first memory of some embodiments is masked such that certain implementation details of the first memory and/or dongle are hidden from the user and operating system of the electronic device. These embodiments typically further do not allow writing of data to the first memory. However, some embodiments specifically allow writing of particular data to the first memory. These embodiments allow a user, operating system, and/or application of the electronic device to particularly save a state or other information. For instance, during the execution of a game, a user advantageously saves the state of the game being played to the first memory. Some embodiments perform the save state function by using the controller to access and write to the file system of the first memory. As needed, some embodiments similarly hide or reveal details regarding the second memory 330, and/or permit or deny read and/or write operations to the second memory 330.

The second memory 330 illustrated in FIG. 3 is typically a non-volatile random access type memory (RAM) such as an EEPROM. Data are often written to the second memory 330 (RAM) at the time of manufacture for use by the automatic recognition and execution operations described above. For instance, when the autorun and startup information includes commands for opening a web browser and navigation to a specific address, the second memory 330 typically includes a universal resource locater (URL) address for use by the web browser. However, other types of addressing, such as local directory and/or memory addressing, for example, and other uses for data storage are recognized by one of ordinary skill. For instance, the second memory 330 of some embodiments further includes a security code. The security code of these embodiments provides automated authorization for secured content and/or access to network services. Hence, a user of such a security code is freed from the burden of providing any personal or financial information, other than the security code, and remains relatively anonymous during the login/and or authentication process. Additionally, these users easily transfer the secure online or network identity from one electronic device to another.

Further, when coupled with the automatic execution and addressing features, the user is freed from the burden of navigation, configuration, and/or execution as well. For the case of joining an online community or game forum, the process is reduced to a true plug-and-play operation. Typically, the data stored in the second memory 330 (the RAM) is not available to a user through a conventional file system on the electronic device, but is hidden from the user and operating system of the electronic device.

Preferably, a startup application stored in the first memory 325 (the ROM) that is loaded and/or executed on the electronic device is enabled to access the second memory by using non-standard features that are customized for the controller 320. In some embodiments, other data are configured for the first and second memories at the time of manufacture and/or at various other times. Certain types of memories particularly lend themselves to uses involving periodic writing and re-writing of data. For instance, electronically erasable programmable ROM (EEPROM), field programmable gate arrays (FPGAs), and flash RAM, are a few types of memories that particularly lend themselves to periodic updating.

In the particular exemplary implementation of the dongle 300 illustrated in FIG. 3, the connector 315 is a standard USB "A" type connector, the controller 320 is a custom USB controller provided by Sonix, Inc., the first memory 325 is an eight megabit masked ROM (MROM), and the second memory 330 is a two kilobit serial flash RAM, all coupled to a conventional printed circuit board (PCB) 335. However, one of ordinary skill recognizes additional sizes for the first and second memories 325 and 330. For instance, the first memory 325 is alternatively a masked ROM having four megabits, or another suitable capacity. The details of an exemplary wiring for the PCB 335 are further illustrated below.

Figure 4:
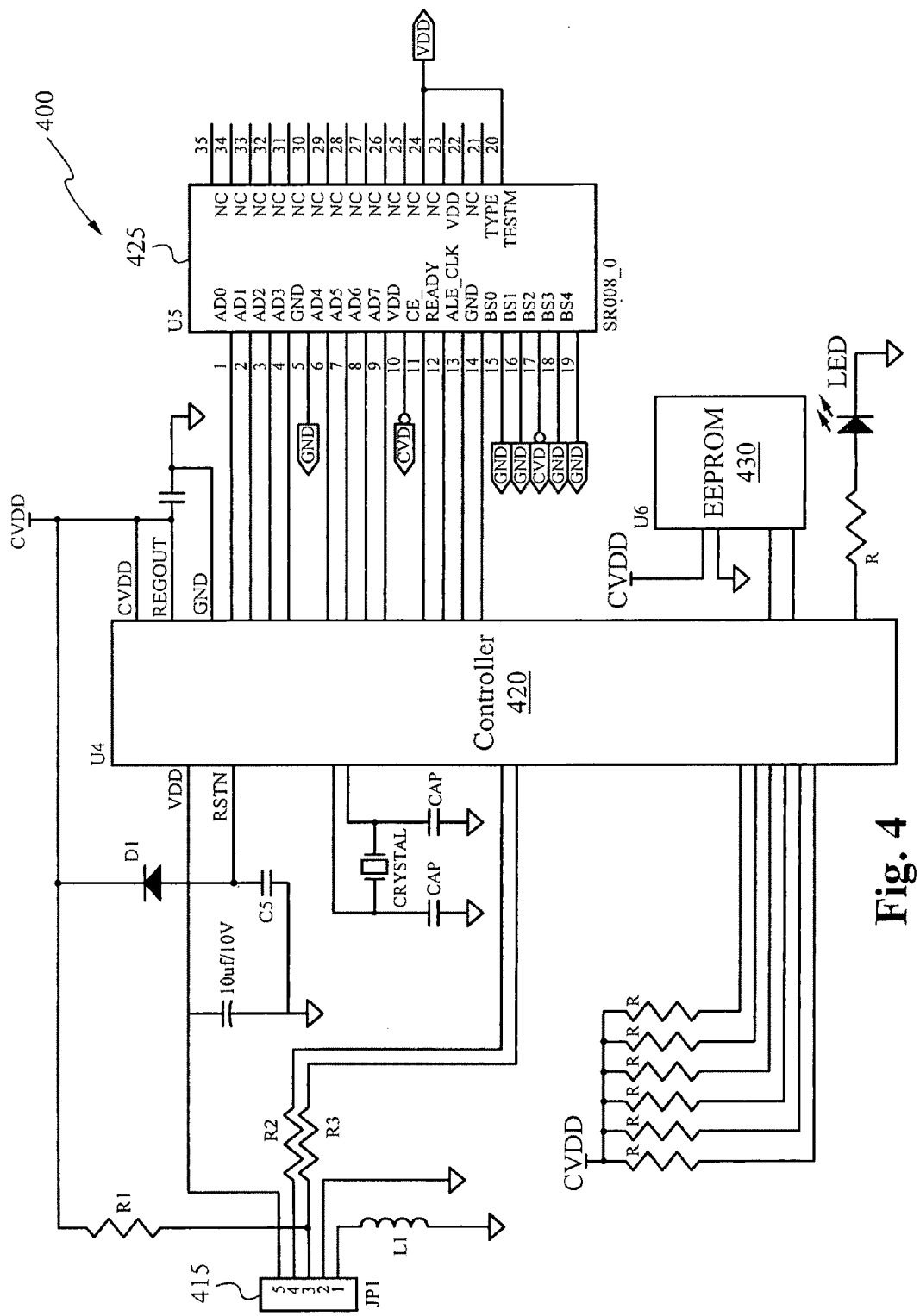
FIG. 4 illustrates a wiring diagram for an exemplary dongle.

FIG. 4 illustrates a wiring diagram for an exemplary dongle 400 in accordance with some embodiments. As shown in this figure, the dongle 400 includes a controller 420 coupled to a connector 415, a ROM 425, and an EEPROM 430. As mentioned above in relation to FIG. 3, the memories typically include a variety of suitable capacities. The controller 420 provides a communications interface between the connector 415, the ROM 425, and the EEPROM 430. The controller 420 further provides a communications interface with a driver on the electronic device (not shown) through the connector 415.

Typically, the electronic device requests information from the controller 420. Then, the controller 420 typically provides data from the memories (ROM 425 and/or EEPROM 430) to the electronic device through the connector 415. Further, in some embodiments, the EEPROM 430 is not directly viewable by an operating system of the electronic device, and is only accessible through the controller 420. The controller 420 of these embodiments is not a conventional controller and performs a non-standard communication access of the EEPROM 430 to secure the information from the operating system and/or the user of the electronic device. For instance, the controller 420 of a particular implementation prevents access to one or more of the memories, except in response to a specific set of instructions. Further, as mentioned above, the memories are alternatively masked and/or contain encrypted data. Thus, information within the EEPROM 430, such as addresses, identification, and security codes, are hidden from unauthorized access.

The dongle 400 of some of these embodiments is provided by KID Group, LLC under the trade name PNP LIVE® or QiGO™. In particular, the USB implementation of some embodiments is provided in conjunction with Wizardtronics, Ltd. of Amesbury, Mass.

II. Operation

Preferably, the dongle 400 is coupled to an electronic device by using a connector 415 coupled to the controller 420 through a circuit board. The electronic device typically provides a power signal to the controller 420 through the connector 415. The power signal is typically generated when the connector for the dongle 400 is inserted into the appropriate port on the electronic device, such as an available USB port, for example. Upon receiving the power signal, the controller 420 typically accesses the data stored in the first memory, for example, the ROM 425. As mentioned above, the stored data typically contains information for automatic execution of a program. For instance, the ROM 425 of some embodiments contains data that launch a default browser application with a specific URL when the dongle 400 is plugged into a USB port. Continuing with the example, parameters for the launched application are retrieved from the second memory such as the flash RAM or EEPROM 430. The parameters of some embodiments include the URL and a security code for accessing secured content and/or a remote program at the URL.

Some embodiments mask certain configuration details from the operating system such that the ROM 425 emulates a particular device such as removable storage or a CD-ROM device. Similarly, some embodiments hide the parameters from the user such that the details of navigation and/or security access are transparent.

The browser application specified by the automatic execution information is either locally or remotely stored. Alternatively, in some embodiments the automatic execution files first look for a specific application, such as a previously downloaded and/or installed program, in the operating system registry and, if available, launch that application with one or more parameters, such as the security code. In these embodiments, a second launch of the specific application is preferably faster than a first launch. The first launch occurs when the dongle is initially coupled to the electronic device. Accordingly, the second launch occurs when the dongle is decoupled from the electronic device and subsequently re-coupled after the first launch. Certain operating systems are particularly enabled for the features of the embodiments described above.

Figure 5:
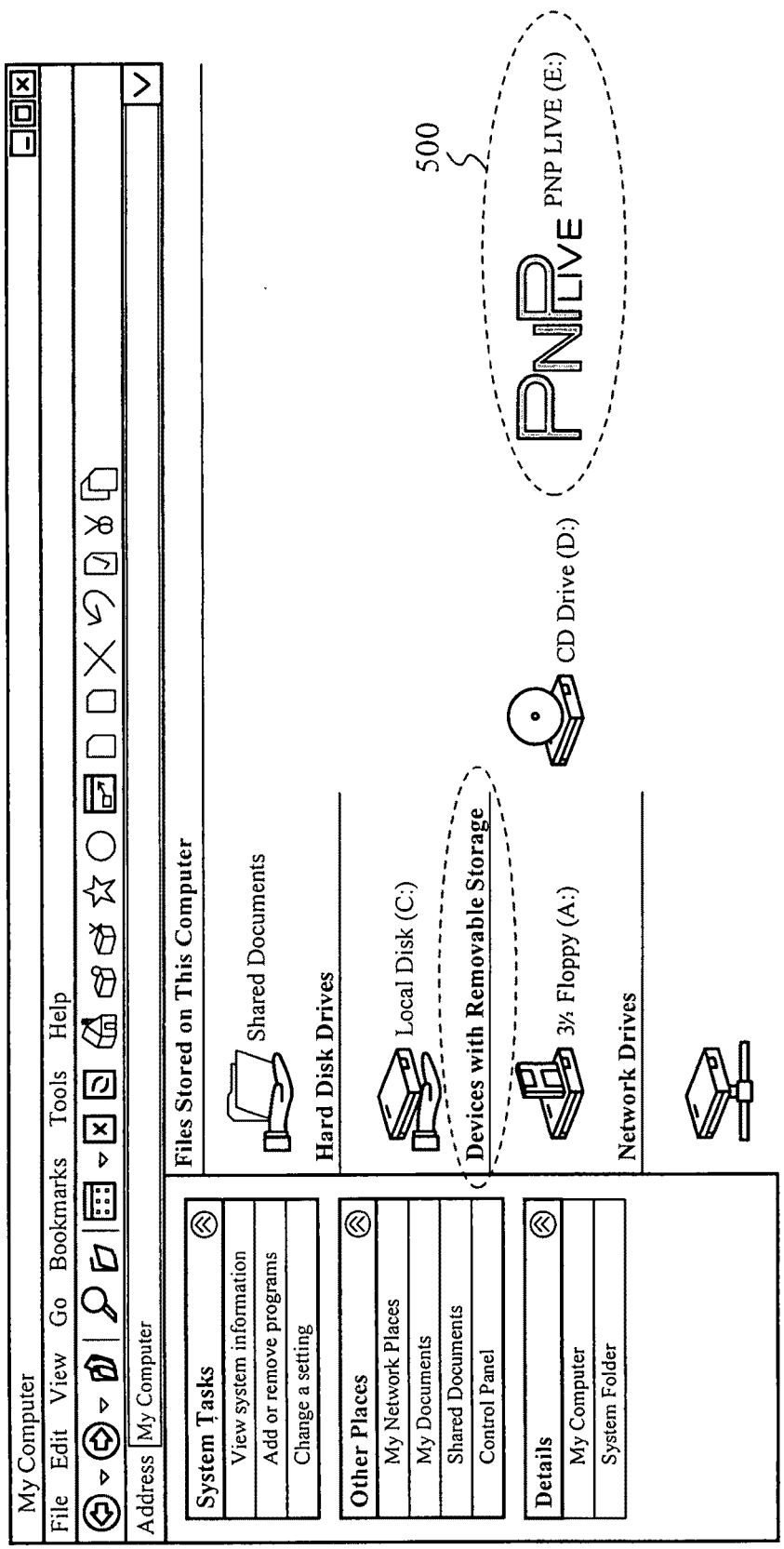
FIG. 5 illustrates a graphical user interface of an operating system in which the dongle of some embodiments is mounted.

For instance, FIG. 5 illustrates a graphical user interface (GUI) of an operating system in which the dongle 500 of some embodiments is mounted. As shown in this figure, the dongle 500 has been mounted in the GUI of the operating system as a device with removable storage entitled "PNP LIVE." Specifically, the operating system has recognized the dongle as a CD and assigned the drive letter "E:" to the dongle 500 emulating a PNP LIVE CD. A dongle will be referred to as mounted when it has been connected to an electronic device and an operating system running on the electronic device recognizes a file system stored on the dongle. The operating system then typically "mounts" the recognized file system.

The exemplary operating system illustrated in the GUI of FIG. 5 is "autorun" compatible. As is known in the art, when particular media are inserted in an electronic device that is autorun enabled, that is, running an operating system that is autorun capable, such as a compact disc (CD) into a CD-ROM drive, some operating systems immediately check to see if the disc has a recognized file system. Some operating systems further check whether the file system supports automatic execution of files and or programs. If the CD has a file system configured for automatic execution, then the operating system searches for an information file that specifies a further action. As mentioned above, the file of some systems is named autorun.inf. The autorun.inf file specifies a startup application for automatic execution, along with a variety of optional settings. The startup application of some embodiments further launches one or more additional application(s).

A. Details of AUTORUN Information Files

An exemplary autorun.inf file will be further described below in relation to the Microsoft Windows operating system and a mounted device that emulates a CD-ROM device. As mentioned above, the autorun.inf file typically references another file such as a startup application. The startup application typically installs, uninstalls, configures, and/or runs a desired application. The autorun.inf file is typically a text file located in the root directory of the removable storage that contains the desire application for automatic execution. The primary function of the autorun.inf file is to provide the system with the name and location of the application for automatic execution. The autorun.inf file also often contains optional information including: (1) the name of an icon file for displaying, by the operating system, an icon in place of the standard drive icon; and (2) additional commands for the shortcut menu that is displayed when the user right-clicks the icon in the operating system's GUI. Here, some embodiments also specify the default command that is run when the user double-clicks the icon.

The autorun.inf file is similar to ".ini" files, in that both include one or more sections. Each section is headed by a name enclosed in square brackets and contains a series of commands that will be run by the operating system when the removable media, such as the dongle, is connected and/or inserted. As is known in the art, the typical operating system executes the commands in a shell. There are two sections that are currently defined for autorun.inf files: (1) The [AutoRun] section, which contains the default autorun commands. All autorun.inf files must have an [AutoRun] section; and (2) An optional [AutoRun.alpha] section, which is included for Microsoft Windows NT 4.0 systems running on RISC-based computers. When the dongle is mounted on a RISC-based system, the shell will run the commands in this section instead of those in the [AutoRun] section.

B. The [AutoRun] Section

The shell checks for an architecture-specific section first. If no architecture specific section is found, the shell uses the information in the [AutoRun] section. After the shell finds a section, it ignores all others, so each section must be self-contained. Each section contains a series of commands that determine how the autorun operation takes place. (There are five commands available.) The following is an example of a simple autorun.inf file that specifies Filename.exe as the startup application. The second line that references icon=Filename.exe,1 uses the image stored in the icon file to represent the file Filename.exe, instead of the standard drive icon.

[AutoRun]
open=Filename.exe
icon=Filename.exe,1

The sample autorun.inf file below illustrates an alternate version of the file illustrated above that additionally runs different startup applications depending on the type of computer, in this case x86 or alpha.

[AutoRun]
open=Filename_x86.exe
icon=IconFile.ico
[AutoRun.alpha]
open=Filename_RISC.exe
icon=IconFile.ico C. The [DeviceInstall] Section The [DeviceInstall] section is for any removable media such as CD media, and such as the dongle which emulates removable CD media, as described above. This section is currently supported only under Windows XP® and has one associated command, "DriverPath," to specify a directory path where Windows XP searches for driver files, which prevents a lengthy search through the entire contents of the removable storage media. The [DeviceInstall] section is often used with a driver installation to specify directories where Windows XP should search the media for driver files. Under Windows XP, entire media are no longer searched by default, therefore the Windows XP operating system (shell) requires [DeviceInstall] to specify search locations. However, Windows XP currently searches the following without a [DeviceInstall] section in an autorun.inf file: Floppy disks found in drives A or B, and CD/DVD media less that 1 gigabyte (GB) in size. All other media must include a [DeviceInstall] section for Windows XP to detect any drivers stored on that media. Hence, the small file system size coupled with the CD media emulation capability of some embodiments has particular advantages with this type of operating system. As with the [AutoRun] section, the [DeviceInstall] section is often architecture-specific.

D. The Startup Application

There are few constraints on the autorun startup application. The startup application of various embodiments implements whatever operation(s) are desired or necessary to install, uninstall, configure, or run an application. However, the startup application preferably provides some feedback to a user who connects the dongle into an electronic device. It is also preferred that startup applications are small programs that load quickly, for instance GUI functions that clearly identify the operation undergoing automatic execution, and optionally a means to cancel the operation. In an additional embodiment, the startup application presents the user with a user interface, such as a dialog box, presenting options on how to proceed. If a program is selected for execution, these embodiments then check to see if the program is already installed. If not, a setup procedure is performed. Preferably the startup application utilizes the time the user spends viewing the dialog box by initiating another thread to begin loading setup code or connecting to a remote location, for example. This approach significantly reduces the user's perception of any automatically executed process.

If the relevant application(s) have already been installed, the user likely connected the dongle with the intention of accessing media or running the installed application(s). As with the setup case, some embodiments start a thread to begin loading application code to shorten the wait time perceived by the user. Storage space is often a limited resource on the connected electronic device and/or the dongle. Accordingly, some embodiments minimize hard disk usage by keeping the number of files that must be stored to a minimum. As data become essential to running the program or for content access by the user, the needed data are retrieved and/or presented by using the navigational and/or authentication properties of the dongle.

Similarly, these embodiments provide an additional level of portability and privacy for the user, as the navigational and authentication means are safely removed from one electronic device and easily transferred to another electronic device by using the dongle. Some embodiments provide additional measures to uninstall any components that were temporarily placed on the local electronic device and/or remote network site(s). Moreover, even though the removable storage has an autorun.inf file, the autorun capability is suppressed in some embodiments programmatically or disabled entirely with the operating system registry. Further details regarding the Microsoft implementation of the autorun.inf file are available at: <http://msdn.microsoft.com/library/default.asp?url=/library/en-us/shellcc/platform/shell/programmers-guide/shell_basics/shell_basics_extending/autorun/autoplay_works.asp>.

E. Autorun Unavailable

As mentioned above, the autorun feature is unavailable at various times, in which case some embodiments employ a system agent or daemon that substitutes for the autorun feature when it is not available. Typically, the system agent must be pre-installed onto the electronic device. Hence, in a particular embodiment, the system agent is manually installed onto the electronic device the first time that a dongle is coupled to the electronic device. In this embodiment, the first time a dongle is coupled to an electronic device, an installer application is provided to a user of the electronic device through mounting of a file system stored on the dongle. The installer application preferably installs the system agent onto the electronic device. The installer application employs installation information stored on the dongle and/or information from a remote location. Alternatively, the first installation of the system agent is performed by an autorun execution, when it is available.

Regardless of whether the system agent is installed via an automatic process such as autorun, or a manual process, subsequent coupling of the same, or other dongles of these embodiments, will cause the system agent to recognize the coupled dongle and launch a browser application that hyperlinks to a retrieved location, and/or provides some content, as described above in relation to autorun execution. Typically, the location is stored in the first memory (or masked ROM). Accordingly, these embodiments are not reliant upon the availability of autorun execution, and further, the need for autorun capability is substituted with the system agent.

Once installed onto the electronic device, the system agent preferably runs as a small process within the operating system. The small system agent process detects whether a dongle is coupled to the electronic device and provides for automatic execution using the information stored on the dongle. Also, the system agent is preferably configured to automatically update itself, when newer versions or changes are made to the system agent. These updates are typically available through a network, at a remote location.

As a particular example, when initially inserted into a Macintosh computer using an OS X type operating system, the dongle appears on the OS X desktop as an ISO 9660 volume. This operating system does not typically have an autorun feature enabled. One of ordinary skill recognizes other times when autorun is unavailable, such as when using the Windows Vista operating system, for example. Instead, the volume mounted on the desktop preferably contains an installer application that installs a system agent for future recognition of one or more dongles, and/or automatic execution by using data stored on these dongle(s). Such automatic execution proceeds as described above. For instance, the dongle first checks whether an entry for a particular program exists in the system registry, and either executes the program by using the path from the registry, or downloads the program from a location stored in the dongle, and installs the program to the electronic device and/or creates an entry for the downloaded and installed program.

Figure 25:
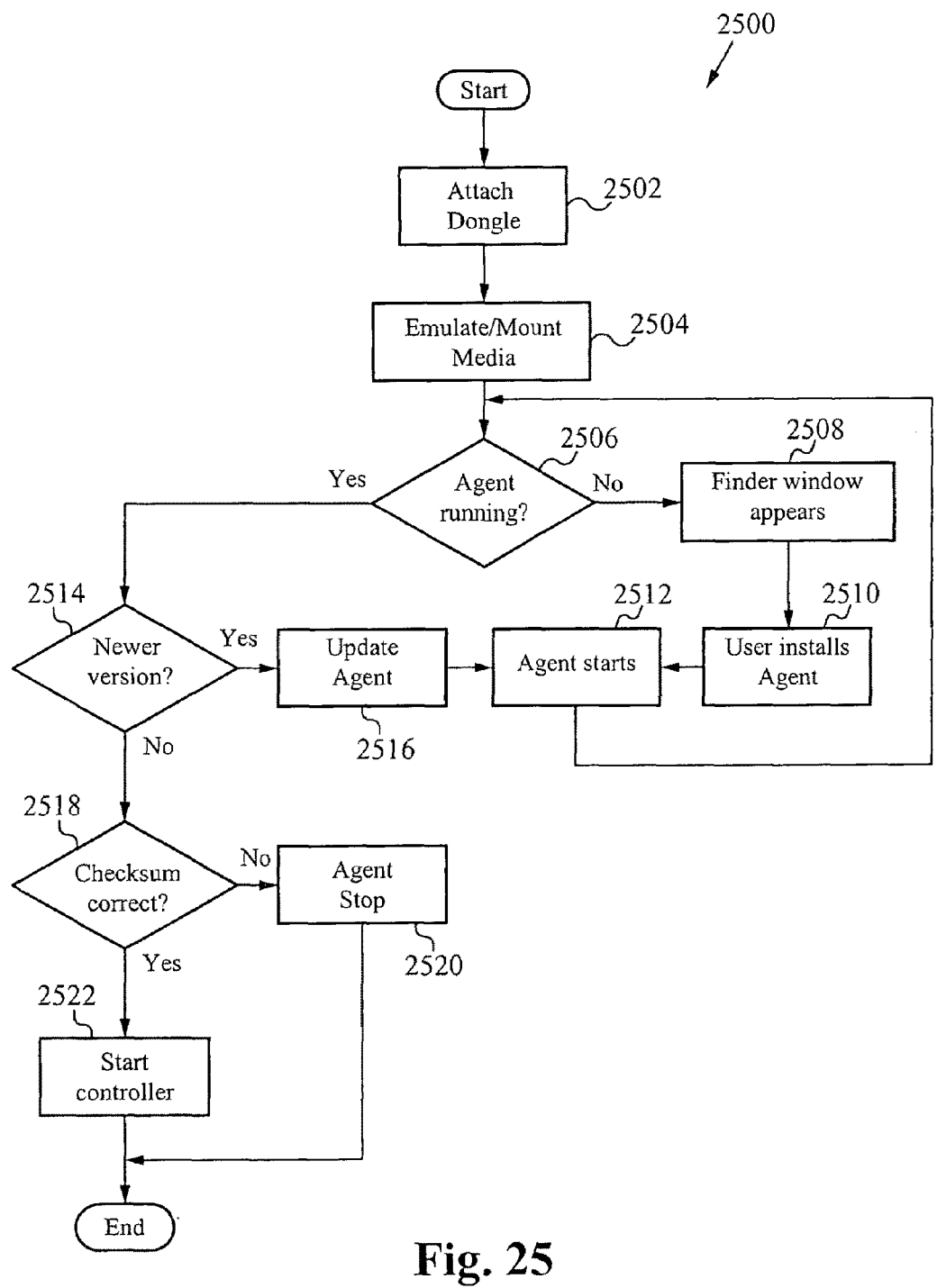
FIG. 25 illustrates a process flow in accordance with some embodiments of the invention.

FIG. 25 is a process flow 2500 that summarizes some of the implementations described above. As shown in this figure, the process 2500 begins at the step 2502, where a dongle is attached. Then, the process 2500 transitions to the step 2504, where a particular media is emulated and/or mounted. For instance, some embodiments mount a file system stored on the dongle as CD ROM or ISO 9660 media. After the step 2504, the process 2500 transitions to the step 2506, where a check is performed to determine whether a system agent or daemon for the dongle is already running and/or pre-installed. If an agent is not running, the the process 2500 transitions to the step 2508, where a window appears on the coupled electronic device. For instance, when the electronic device is a Macintosh computer, a Finder window appears on the desktop of the operating system environment. Preferably, a user of the electronic device installs the system agent for the dongle at the step 2510, and the agent starts running at the step 2512. Then, the process 2500 returns to the step 2506.

If, at the step 2506, the agent is running, then the process 2500 transitions to the step 2514, where a check is made for a newer version of the agent. If a new agent is found at the step 2514, then the agent is updated at the step 2516, and the updated agent starts running at the step 2512. As described above, the process 2500 returns to the step 2506 from the step 2512.

If, at the step 2506, no newer version of the agent is found, then the process transitions to the step 2518, where a checksum is checked on the dongle. For instance, the controller of some embodiments provides the checksum. If the checksum is not correct at the step 2518, then the process 2500 transitions to the step 2520 where the agent stops, and the process 2500 concludes. If the checksum is correct at the step 2518, then various features of the dongle are enabled and/or begin operation. For instance, the controller of some embodiments begins operation. After the step 2522, the process 2500 concludes.

III. Example Implementations

A. Yu-Gi-Oh! Online and Local Game Applications

Figure 6:
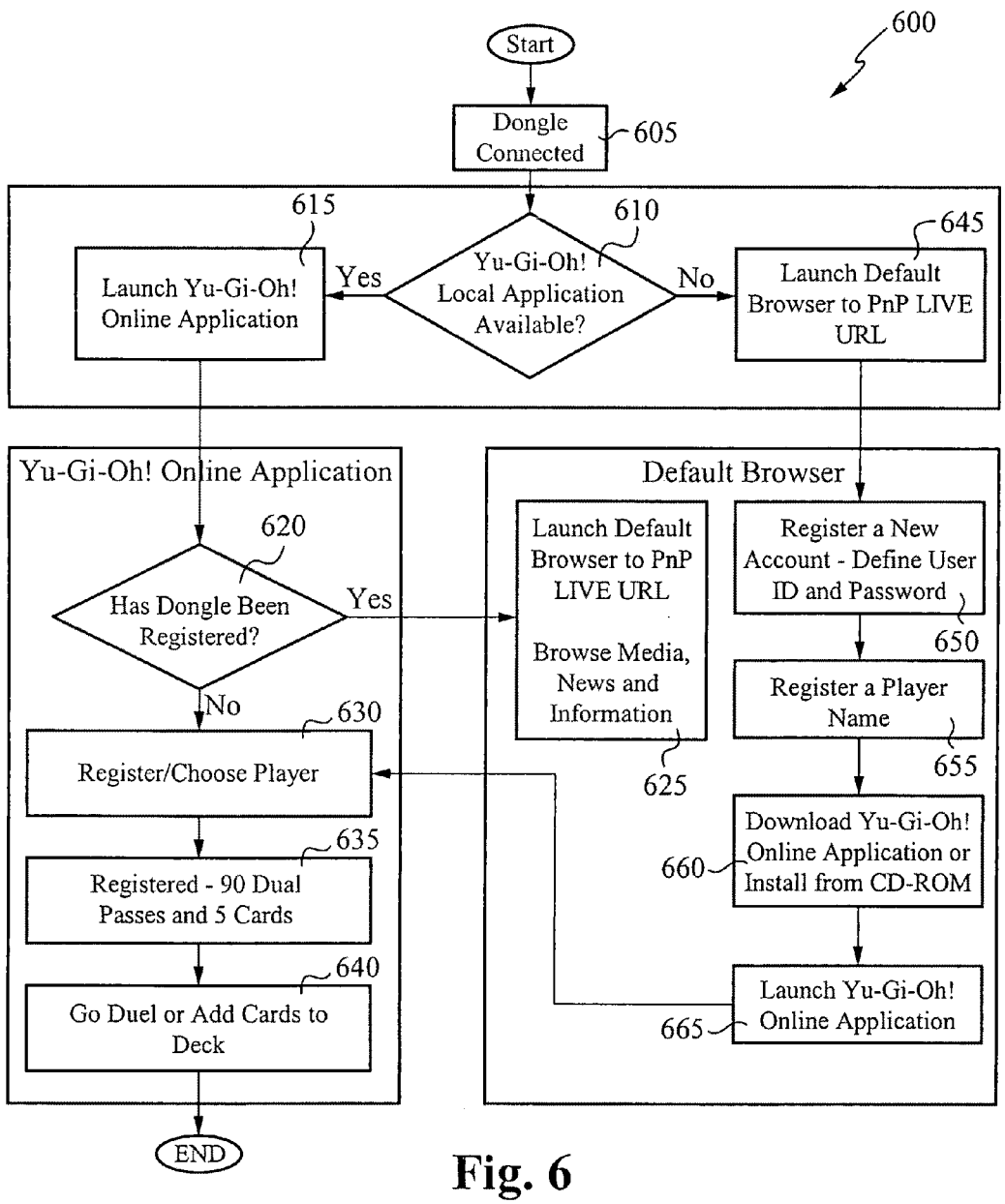
FIG. 6 illustrates a process for the automatic execution of an application triggered by some embodiments.

Once automatic execution is triggered and underway as described above, a number of processes, operations, procedures, and the like, are spawned, executed, and/or performed in various embodiments. For instance, FIG. 6 illustrates a process 600 for the automatic execution of a game application Yu-Gi-Oh! triggered by some embodiments.

As shown in this figure, the process 600 begins at the step 605, where the dongle of the embodiments described above is connected with an electronic device. Then the process 600 transitions to the step 610, where it is determined whether Yu-Gi-Oh! application is available locally. If the application is available locally, the process 600 transitions to the step 615, where an automatic execution script begins launching the Yu-Gi-Oh! application locally before the process 600 transitions to the step 620 to launch the online application. As described above, the information and commands necessary for navigating and connecting to the online application are typically stored locally in the memory of the dongle.

Figure 6A:
FIG. 6A illustrates a GUI for the Yu-Gi-Oh! online application.

At the step 620, it is determined whether the dongle is properly registered. For instance, some embodiments compare authentication information such as the security code stored by the dongle to an online list. For the embodiment illustrated in FIG. 6, the security code is used to determine what cards are available and to whom the cards, security code, and/or dongle belong. If at the step 620, the dongle is registered, then the process 600 transitions to the step 625, where the user of the dongle is granted online access to a panoply of online media, news, information, and services. For instance, some embodiments launch an application such as a default browser on the user's electronic device. Some of these embodiments further jump to a predetermined local or network location such as the PnP Live site provided by KID Group, LLC. At the automatically addressed and linked location, the user selects from a number of games and services for which authorization is provided such as the Yu-Gi-Oh! online game. As mentioned above, the location is typically provided by the dongle's onboard memory storage. FIG. 6A illustrates an exemplary GUI for an Yu-Gi-Oh! online application that was linked for automatic navigation and/or authentication, in accordance with some embodiments.

If at the step 620, the dongle has not been properly registered, then the process 600 transitions to the step 630, where an opportunity is provided to register the dongle and/or a new user. Once registration occurs, some embodiments provide additional opportunities at the step 630. For instance, the game embodiments such as the illustrated Yu-Gi-Oh! online game example, allow the newly registered dongle/user to choose a player or character from a library of game characters. Then, the process 600 transitions to the step 635.

Figure 6B:
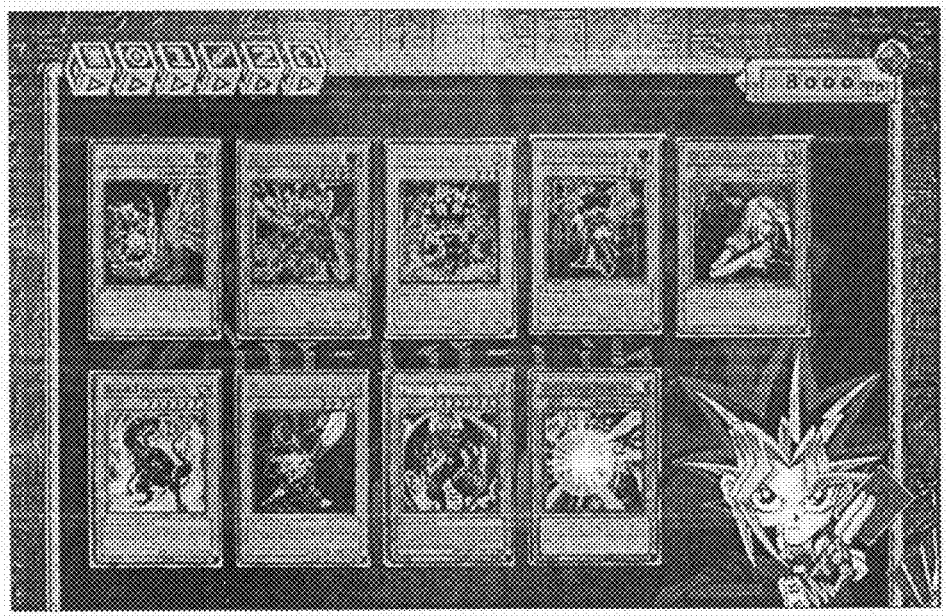
FIG. 6B illustrates a card trading feature available in some embodiments.

At the step 635, the newly registered dongle and/or user is granted an allotment of attributes for participation in the Yu-Gi-Oh! online game. For instance, some embodiments provide 90 duel passes and five playing cards to the user of the newly registered dongle. Then, the process 600 transitions to the step 640, where the game play begins. In the Yu-Gi-Oh! embodiment illustrated in FIG. 6, players typically go to a specific area of the online community environment to duel each other by using selected game characters, or to add character and/or playing cards to their decks by trading or by other means. FIG. 6B illustrates an online location for such a card collection and/or trading activity. As shown in this figure, the character/playing cards are particularly relevant to the Yu-Gi-Oh! game application. After the step 640, the process 600 concludes.

As shown in FIG. 6, the process 600 typically checks whether the Yu-Gi-Oh! local application is installed and launches it, if available at the step 610. If, however, the local application is not available, then the process 600 transitions to the step 645, where the process 600 begins launching of an application such as a browser. The browser application is optionally stored and/or accessed locally on the dongle, on the electronic device, at a remote location, or a hybrid of these. One of ordinary skill recognizes the variations in local and remote storage and access, to optimize speed and efficient use of the resources described above for the dongle and/or electronic device. For instance, some embodiments use the local browser application to hyperlink to a predetermined local or network location such as the PnP Live network site mentioned above. Also mentioned above, the URL or address for the network location is often stored in the dongle's memory.

Regardless of the speed and efficiency optimizations, once the browser begins launching at the step 645, the process 600 transitions to the step 650, where the user of the dongle is permitted to define the user's online identity and/or a password. Then the process 600 transitions to the step 655, where the user typically registers an online player or character name. Optionally, the functions and information of the steps 650 and 655 of the process 600, are provided by the dongle of some embodiments described above. For instance, some embodiments forego additional registration information by using the dongle's stored security code. These secure users add additional user profile information, at their option, when deemed appropriate or desirable.

Once authentication is complete at the step 655, the process 600 transitions to the step 660, where one or more components of the Yu-Gi-Oh! application are downloaded for local installation on the electronic device. One of ordinary skill will appreciate the additional means by which the components of the application are locally installed, such as, for example by an authenticated CD/DVD, or other suitable installation media.

Once installation is complete at the step 665, the process 600 begins launching the online portions of the application (in this case, the Yu-Gi-Oh! online application), and transitions to the step 630. Then, the process 600 proceeds as described above.

As illustrated in FIG. 6, the process 600 is conceptually divided into three areas of access and/or storage. As shown in this figure, the steps 610, 615, and 645 are typically relevant to the access of data and/or executable applications that are stored on the dongle, while the steps 625, 650, 655, 660 and 665 are typically relevant to the electronic device, such as a default browser application accessible on the electronic device. Similarly, the steps 620, 630, 635, and 640 are typically relevant to an online location, such as the Yu-Gi-Oh! online application.

One of ordinary skill will recognize variations in the process 600 illustrated in FIG. 6. For instance, as indicated above, some embodiments perform application launching and hyperlinks differently. For instance, these embodiments apply concise algorithms to more efficiently launch the Yu-Gi-Oh! local and/or online applications and check for the dongle, security code, or other identification and authentication measures. For instance, some embodiments employ smaller separate applications or applets to, for example, register the dongle and then launch the Yu-Gi-Oh! online application. Also, if online access is not available, the dongle of some embodiments cannot access the registration process, and thus the local application proceeds without online access, until online or network access becomes available.

B. Redline Rumble Game Application

Figure 7:
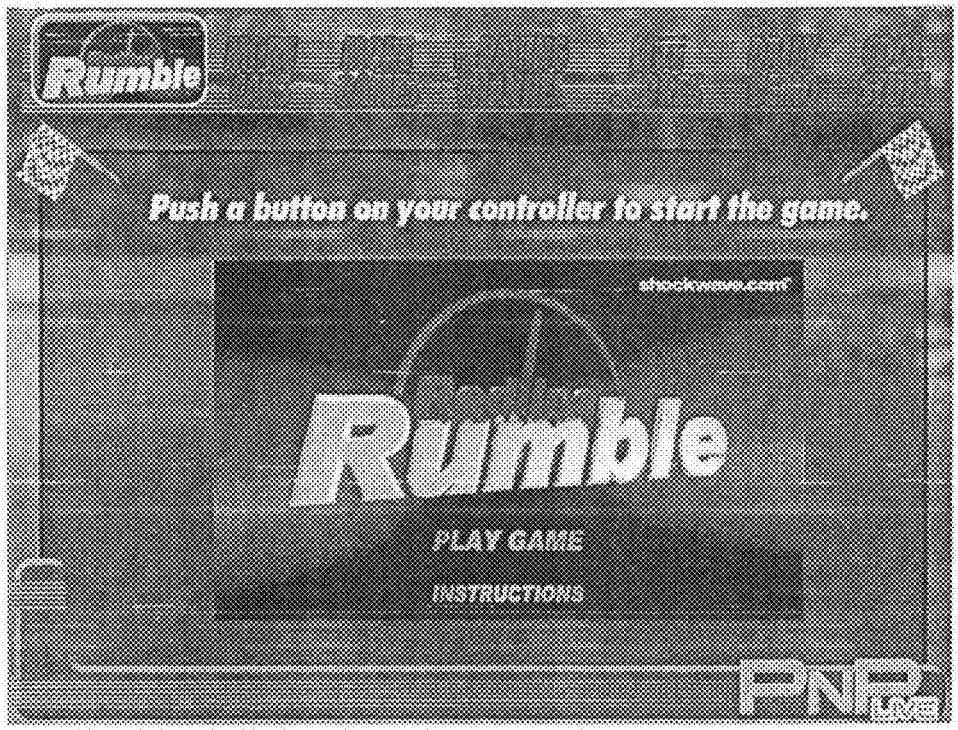
FIG. 7 illustrates a GUI and process in accordance with an embodiment of the invention.
Figure 7:
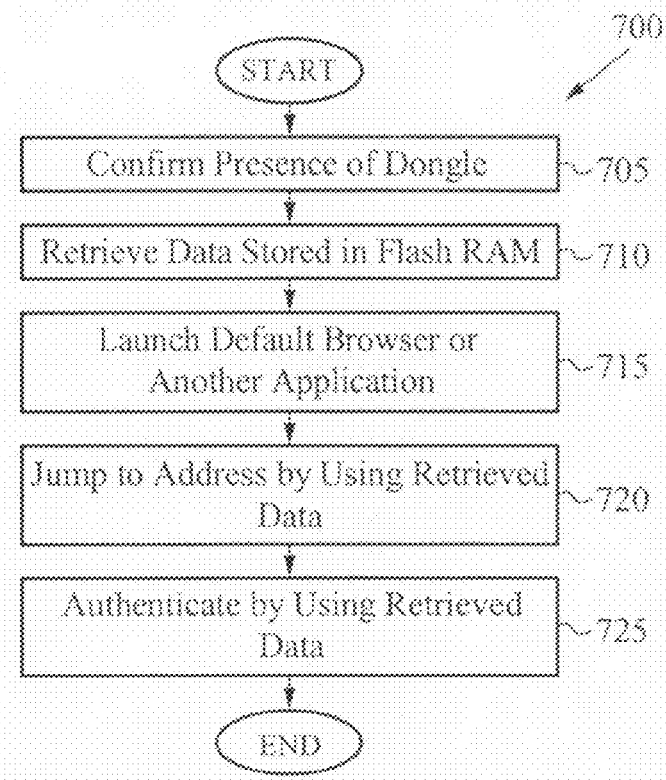

As previously mentioned, a number of games and other content are provided by various embodiments of the methods and means described above. In another instance, FIG. 7 illustrates a GUI for another game called "Redline Rumble." As shown in this figure, the Redline Rumble game application includes an authentication process 700 that begins at the step 705 by confirming the presence of a dongle in accordance with some of the embodiments described above. Then, at the step 710 the application accesses and retrieves the data stored in the memory of the dongle, for example, a Redline Rumble URL and/or security code stored in a flash RAM. Next at the step 715, the application launches a default browser or another application specified by the retrieved data. At the step 720, if the retrieved data contains an address such as a URL, the application jumps to the location specified by the retrieved data. At the step 725, the application authenticates the particular dongle by using the retrieved data. For instance, the retrieved data of some embodiments contains a security code, which permits verification for access. Once the dongle is authenticated, the process 700 concludes. At this point, the user of the dongle typically begins participating in some online activity such as playing an online network version of the application.

Alternatively, the features of the dongle are programmed to launch an existing valid application from the operating system registry, such as a local or hybrid version of the Redline Rumble application. As described above, portions of the application are stored differently in various embodiments. For instance, the dongle of some embodiments stores a startup application, while the electronic device stores a local version of the Redline Rumble application, and an online version is stored remotely at the network gaming site.

C. Additional Implementations

Figure 8:
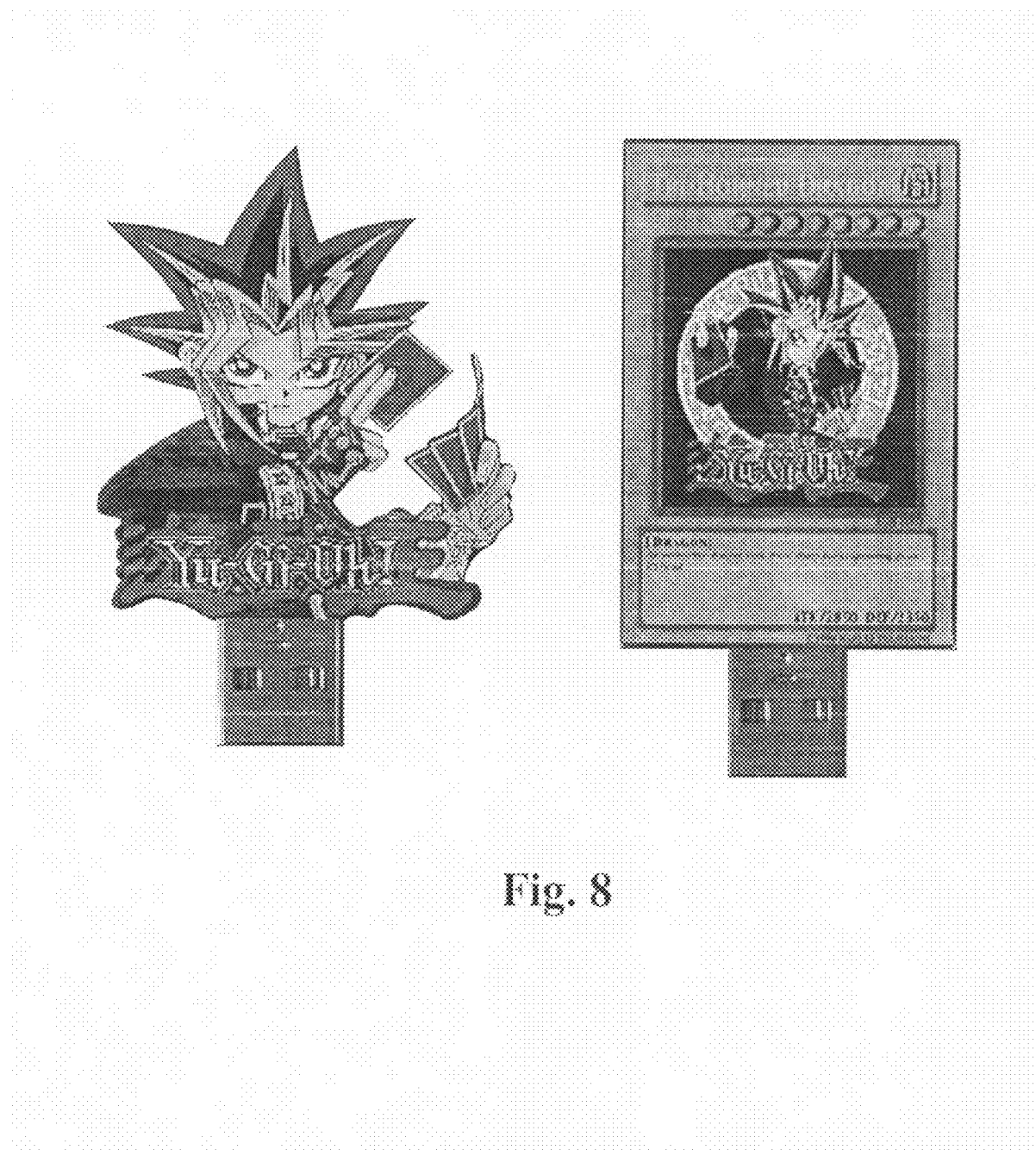
FIG. 8 illustrates physical implementations of the dongle of some embodiments.
Figure 9:
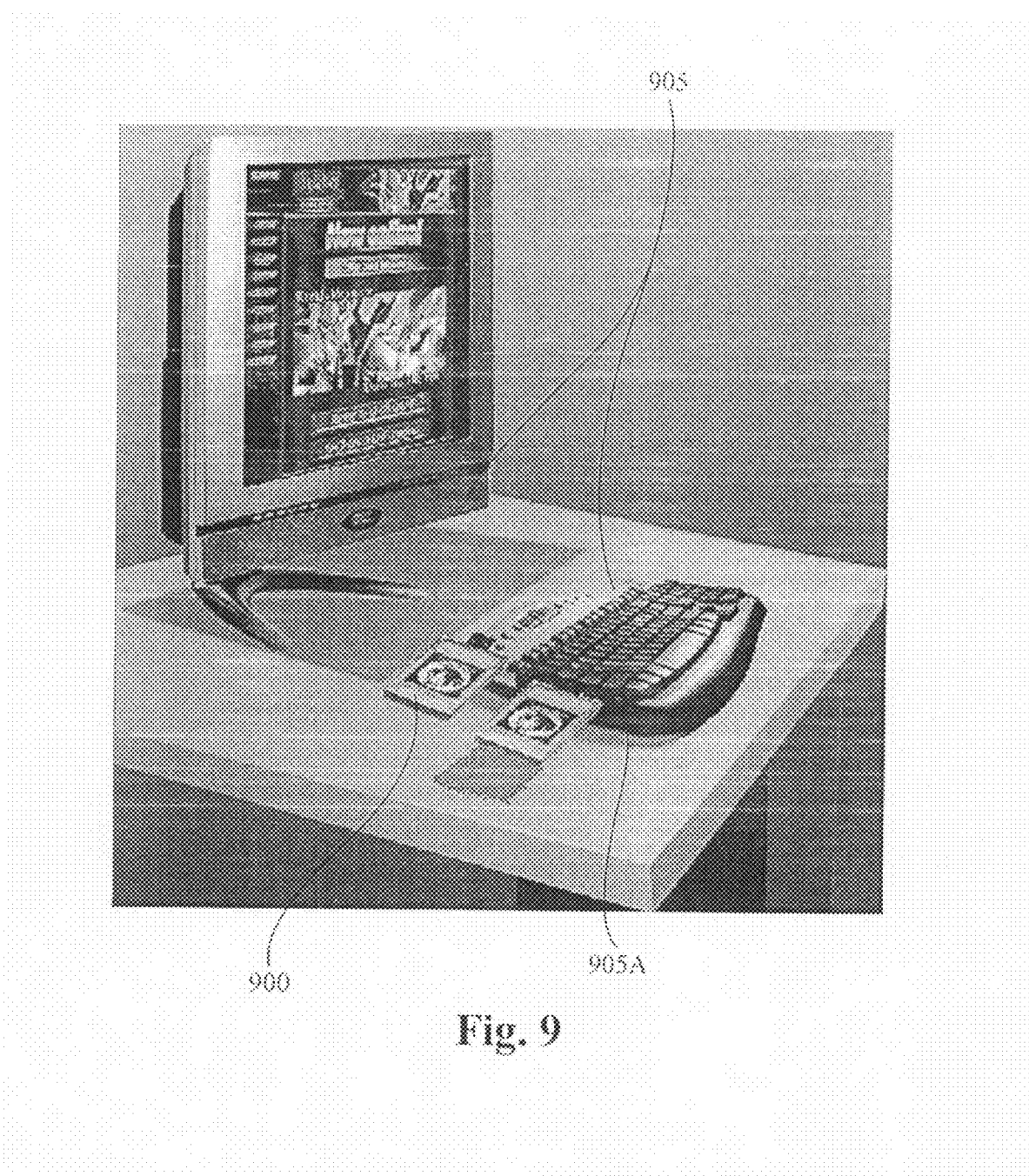
FIG. 9 illustrates the dongle of some embodiments inserted in a personal computer.

FIG. 8 illustrates that the dongle of some embodiments has particular shapes. As shown in this figure, the shapes of various embodiments have particular significance to a user. For instance, the dongles 800 illustrated in FIG. 8 have particular significance for a particular character and/or playing card that is part of the Yu-Gi-Oh! application described above. FIG. 9 illustrates the insertion of these dongles 900 into a desktop personal computer electronic device 905 in accordance with the invention. As shown in this figure, the dongles 900 are inserted into an appropriate port 905A for automatic navigation and authentication to the Yu-Gi-Oh! online application.

Figure 10:
FIG. 10 illustrates the dongle of some embodiments customized for card games.

FIG. 10 illustrates that the shape of some embodiments further includes additional functional features that are adapted to a particular game. For instance, as shown in this figure, the dongle 1000 is adapted for a card playing game. Specifically, as illustrated on the display of the personal computer 1005 of FIG. 10, the user of this embodiment is using the dongle in an online poker tournament. Similarly, FIG. 11 illustrates a dongle 1100 that is adapted for racing type games, including the NASCAR auto racing game illustrated in the display of the personal computer 1105 illustrated in this figure.

Figure 11:
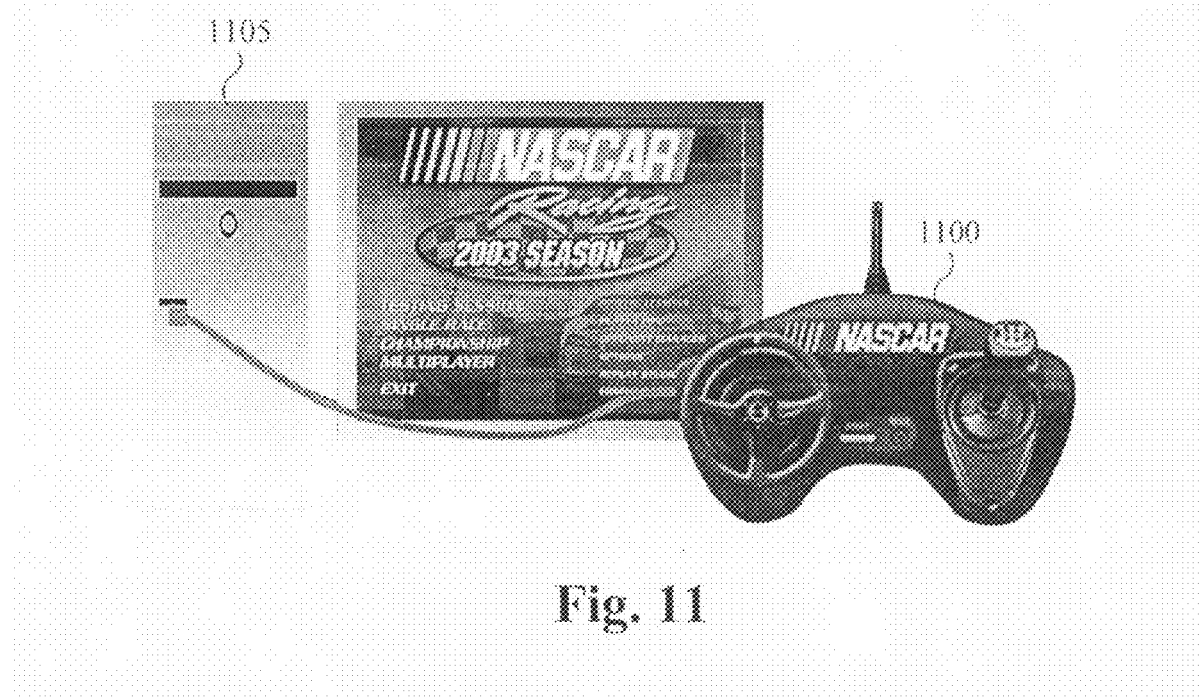
FIG. 11 illustrates that the dongle of some embodiments is customized for racing games.

Preferably, the functional features of the dongle 1000 and 1100 of FIGS. 10 and 11, respectively, are supported by the internal circuitry described above in relation to FIGS. 3 and 4. More specifically, the controller of particular embodiments provides electronic. (digital and/or analog) support for the various mechanical aspects of these dongles, such as the buttons, joystick, wheel, trackball, and/or other cursor type controls. Some embodiments incorporate the button and/or cursor movement support electronics in the controller 320 and 420, while some embodiments provide the support by using an external application specific integrated circuit (ASIC) or a micro control unit (MCU) in conjunction with the controller. The controller 2200 and micro control unit 2300 of a particular implementation are illustrated in FIGS. 22 and 23, respectively.

Figure 22:
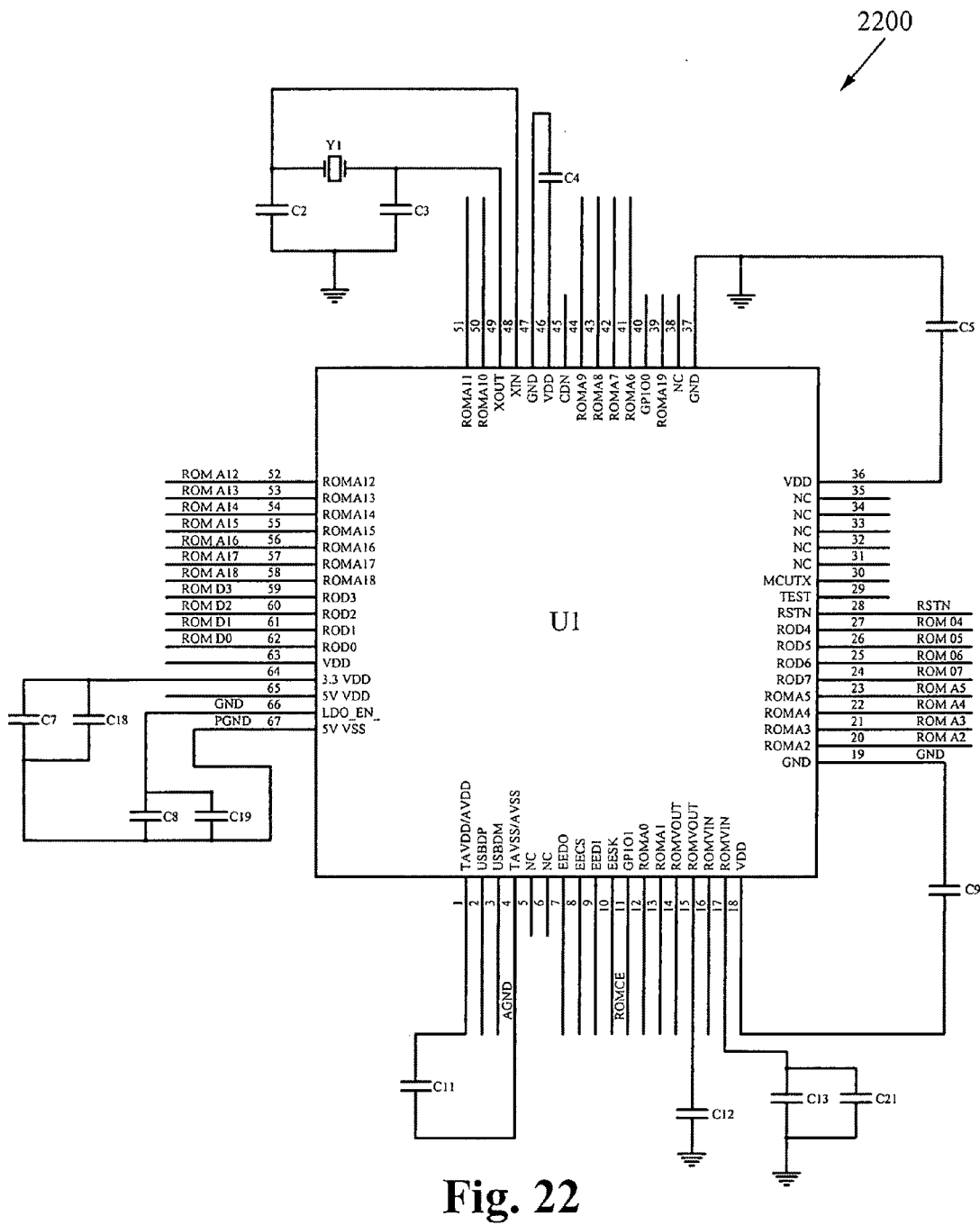
FIG. 22 illustrates a controller in accordance with a particular implementation.
Figure 23:
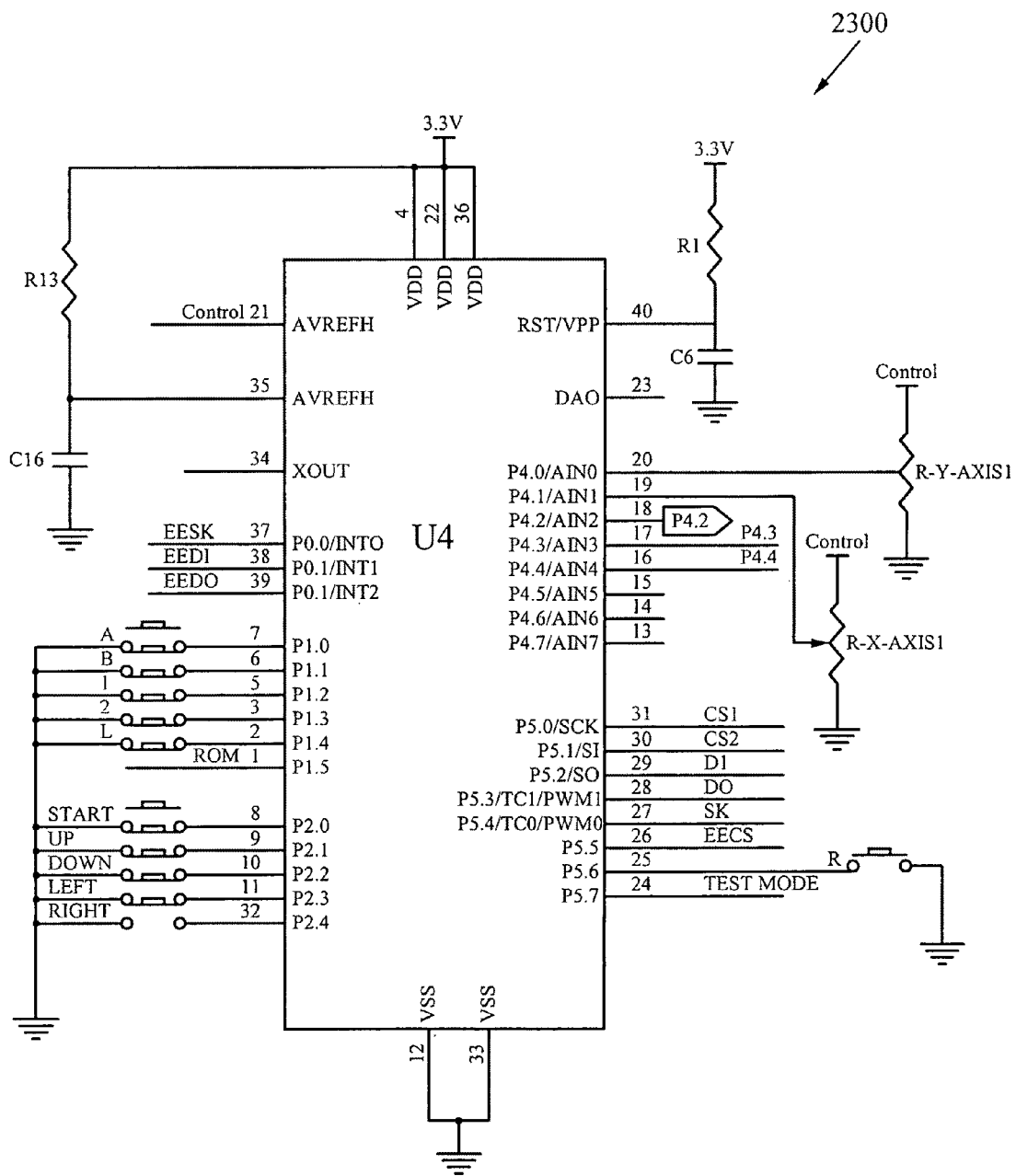
FIG. 23 illustrates a micro control unit in accordance with a particular implementation.

The controller 2200 of FIG. 22 is configured to couple with the micro control unit 2300 of FIG. 23 through a set of pins. The controller 2200 further includes pins configured for coupling to the memories and connector of the dongle. The particular implementation 2200 illustrated in FIG. 22 has 67 pins for receiving power, circuit grounding, and/or coupling to a connector, memories, and micro control unit. For instance, the pins labeled "ROM" are typically coupled to the memories including the first, second, and/or additional memories described below in relation to FIGS. 14 and 15. The exemplary implementation 2200 has the part number SN11001, and is provided by Sonix, Inc.

As illustrated in FIG. 23, the micro control unit 2300 includes several pins configured to receive input from several switches, such as from the buttons and other cursor controls provided on the dongle 1000 and 1100 of the FIGS. 10 and 11 described above. As shown in FIG. 23, the pins that correspond to some mechanical features are arbitrarily labeled START, UP, DOWN, LEFT, and RIGHT. The micro control unit 2300 further includes pins configured to receive power and control signals. Typically, the control pins of the micro control unit 2300 are coupled to the pins of the controller 2200. For instance, the pins labeled EECS, EESK, EEDI, and EEDO on the micro control unit 2300 are preferably coupled to the similarly labeled pins on the controller 2200. The exemplary implementation illustrated in FIG. 23 has the part number SN8A2706/2708, and is provided by Sonix, Inc.

Figure 24:
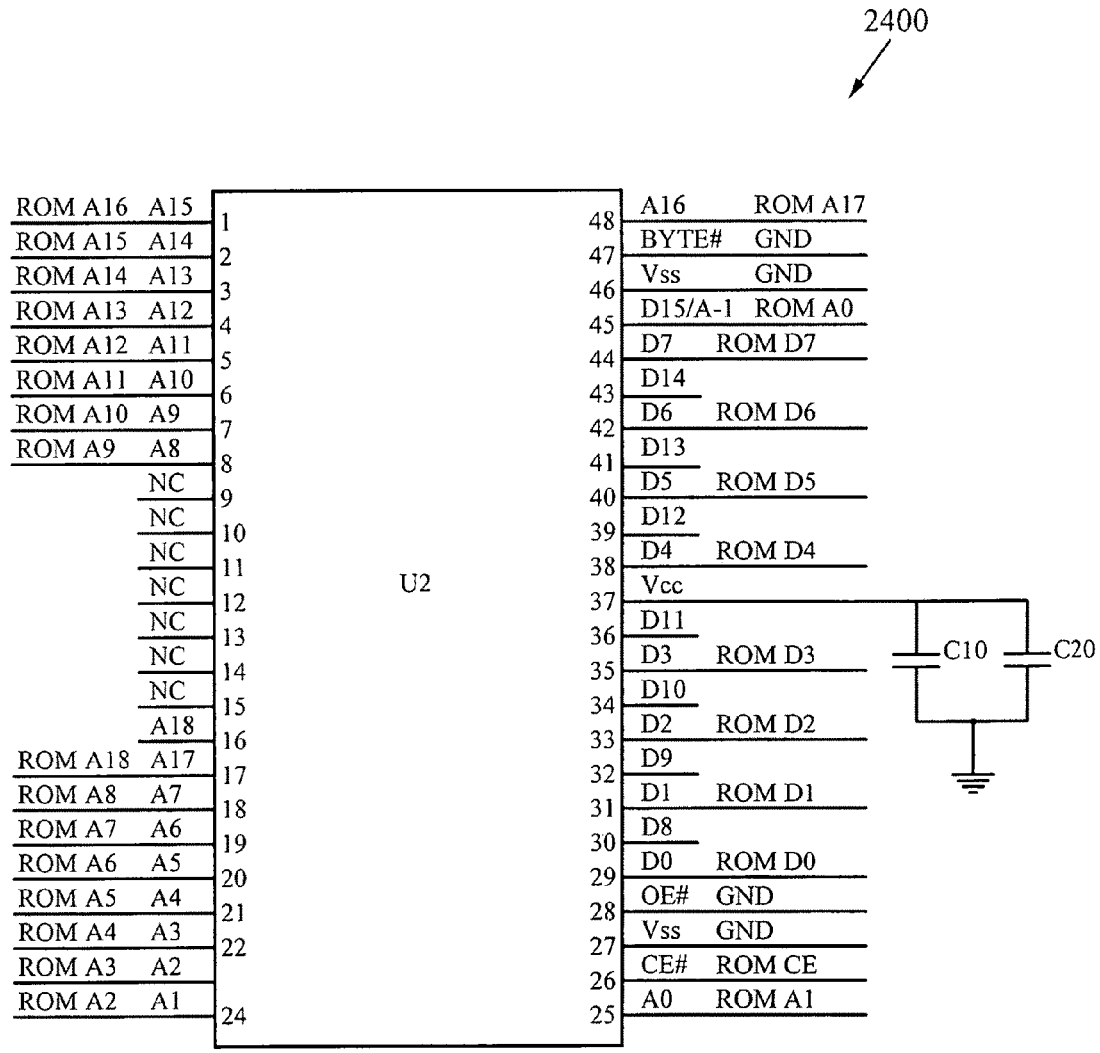
FIG. 24 illustrates an exemplary memory in accordance with a particular implementation.

FIG. 24 illustrates an exemplary memory 2400, which is coupled to the controller 2200 of FIG. 22 and the micro control unit 2300 of FIG. 23. The particular illustrated memory 2400 is preferably a masked type ROM, which, as described above in relation to FIGS. 3 and 4, is typically used as the first memory of the above described embodiments 300 and 400. However, one of ordinary skill will recognize that the memory 2400 is optionally implemented by using EEPROM, or an alternative form of memory. Also described above, the second, third, or additional memories, are typically implemented by using EEPROM. However, one of ordinary skill also recognizes that these one or more additional memories are optionally implemented as masked ROM such as the memory 2400 illustrated in FIG. 24, or an alternative form of memory, depending upon the read/write/re-write characteristics desired for each of these memories.

As shown in FIG. 24, the memory 2400 is coupled to the controller 2200, pin-by-pin as designated in the figure. For instance, the pin labeled "A1" of the memory 2400 is coupled to the pin labeled "ROM A2" on the controller 2200. Hence, only the controller 2200 typically couples directly to the memory 2400, while other components such as the micro control unit 2300 utilize one or more functionalities provided by the memory 2400, through the controller 2200. The exemplary implementation illustrated in FIG. 24 has the part number MV27V802F-P2, and is provided by Motorola, Inc.

In another embodiment of the invention, the dongle includes facets of an electronic lifestyle that includes, for instance, an electronic pet. In a particular aspect of some of these embodiments, a user builds an electronic aquarium by purchasing dongles that contain discrete features of the aquarium, such as fish, plants, rocks, and other items found in an aquatic environment, for example. Some embodiments further allow the user to share the features of the constructed electronic lifestyle with the electronic lifestyles of other users by connection to an online network service and/or through direct connection of the dongle to one or more electronic devices. For instance, the user of a dongle having a memory that comprises an electronic fish transports the fish to "visit" another user's aquatic environment by connection of the electronic fish dongle to the electronic device that hosts the aquatic environment to be visited. Alternatively, the electronic fish "swims" from one user's aquatic environment to visit another user's aquatic environment through connection to the online services for an online community devoted to such aquatic environments and electronic pet fish.

D. Online Network

Figure 12:
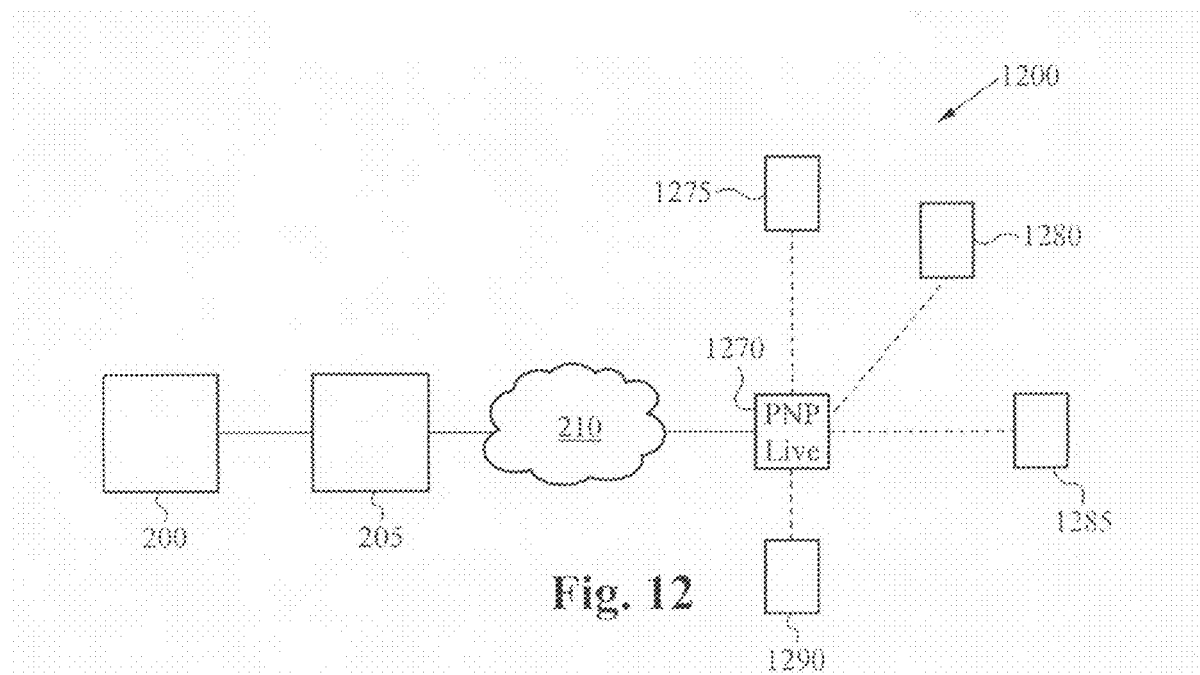
FIG. 12 illustrates the network environment of some embodiments.

The content provided by some of the embodiments described above is provided by a network environment. FIG. 12 illustrates an example of such a network environment 1200. As shown in this figure, the dongle 200 is coupled to a network 210 through an electronic device 205. The network 210 includes a number of network topologies including LAN, WAN, VPN, and/or network-of-networks such as the Internet. Several servers are coupled to the dongle 200 through the networked electronic device 205. Representative examples of these servers include a network hub server 1270, a game content server 1275, a license server 1280, a communication server 1285, and a marketing content server 1290.

The network hub server 1270 typically provides a set of connections and tools to manage data access and flow between a user of the dongle and electronic device and the other servers comprising the online content network. For instance, a service provider typically manages, by using the network hub server 1270, the connection between the dongle and the online game, including the interface for browsing and purchasing new content. The game content server 1275 is typically used to provide game content for the games such as Yu-Gi-Oh! online and Redline Rumble online, which were described above. The licensing server 1280 is employed by some embodiments for the user authentication and/or security code verification that permits the dongle of these embodiments to access the online content and servers. Online licensing includes activities of end users, and also includes the activities of additional content and/or service providers or resellers, in some embodiments.

Some embodiments use the communication server 1285 for communications between the users accessing the network content, such as competitors in an online game, or online moderator, editors, and content providers. Conventional communications protocols include instant messaging, chat, and voice-over-IP. However, additional communication protocols are understood by one of ordinary skill. The marketing content server 1290 is typically used to provide additional subscription, cross sell, and up sell opportunities to the user. In some embodiments, the servers, particularly the network hub server 1270, are provided by KID Group, LLC. However, content and one or more servers are often provided by other entities. For instance, a toy manufacturer often provides marketing content related to an online game or online trading cards. This marketing content includes subscription offers and offers for sale of games, toys, and/or additional online network services, for example.

IV. Additional Embodiments

A. Selectable, Configurable and/or Removable Memories

Figure 14:
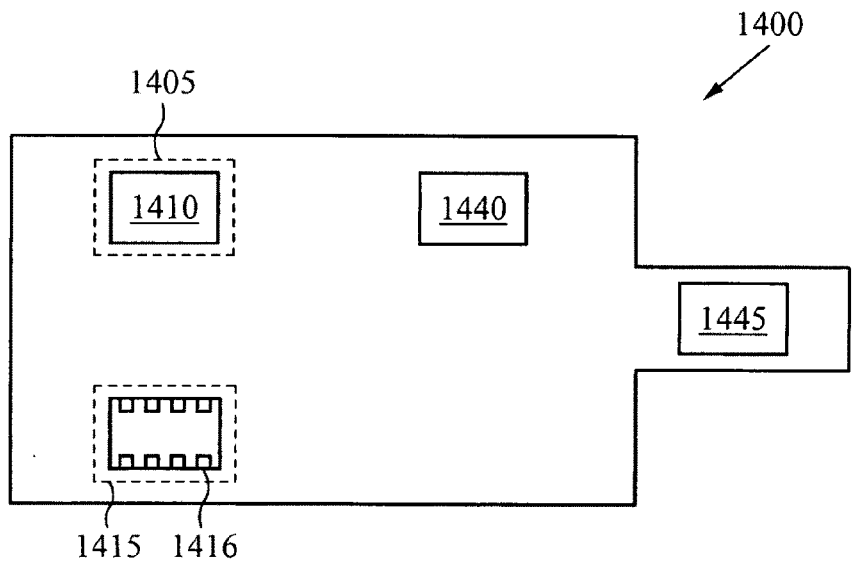
FIG. 14-14B illustrates a dongle with loci in accordance with some embodiments of the invention.
Figure 14A:
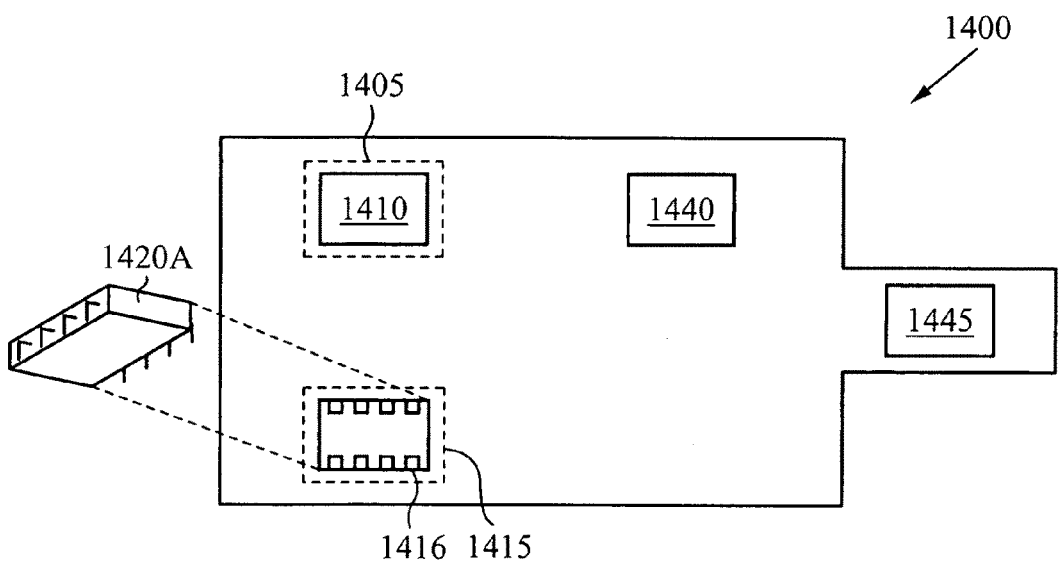
Figure 14B:
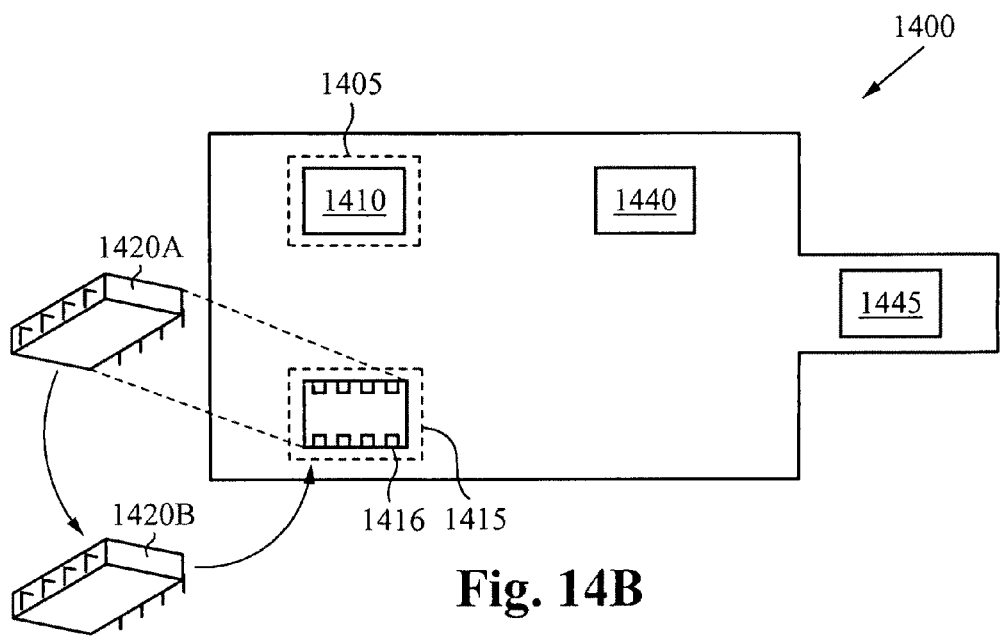

FIGS. 14, 14A and 14B illustrate that in addition to a first memory 1410 and a second memory 1420A, the dongle 1400 of some embodiments further includes a first locus 1405 and a second locus 1415 for the memories. As shown in these figures, the first memory 1410 is positioned within the dongle 1400 by using the first locus 1405, while the second memory 1420A is positioned by using the second locus 1415. The memories 1410 and 1420A are typically coupled to a controller 1440, which is coupled to a connector 1445, as described above in relation to FIGS. 3 and 4.

Particular embodiments include a socket 1416 within the second locus 1415. In these embodiments, the socket 1416 is preferably configured such that the second memory 1420A is removable from the socket 1416. For instance, when the second memory 1420A comprises a removable EEPROM, the EEPROM is selectively inserted or removed from the socket 1416. In these cases, the second memory 1420A typically provides one or more functions for the dongle 1400 via a set of user selectable configurations for the second memory 1420A. In a particular embodiment, each separate configuration has a user selectable functionality. As such, when the second memory 1420A of these embodiments is replaced by using an alternate configuration for the second memory 1420B, an alternate functionality is selected. Alternatively, the second memory 1420A is programmed and/or reprogrammed to provide the additional feature and/or function.

As an example, in one implementation, a first configuration for the second memory 1420A includes a removable EEPROM having access data for particular content, such as Yu-Gi-Oh! content, for instance. A second configuration for the second memory 1420B includes a removable EEPROM having access data for different content, such as Redline Rumble content, for instance. Hence, these exemplary configurations for the second memory are selected for use, by insertion, programming, and/or by another means. As described above, the functionality and/or access data of some embodiments include a URL and a secure identifier code, but typically does not include some or all the content data, which is typically available from another (remote) source. As also mentioned above, the functionality and/or data are hidden and thus transparent to the user and/or electronic device. Preferably, only the controller coupled to the memories has access to the hidden information, thereby providing a degree of security and resistance to cloning and similar undesirable activities.

One of ordinary skill recognizes additional functionalities provided by the memories, and further recognizes particular implementation advantages. For instance, EEPROM have certain advantages in terms of low cost, and ease of manufacturing configuration, and/or a number of other features, such as removability or swappability. Moreover, additional memories and/or loci are contemplated in further embodiments.

Figure 15:
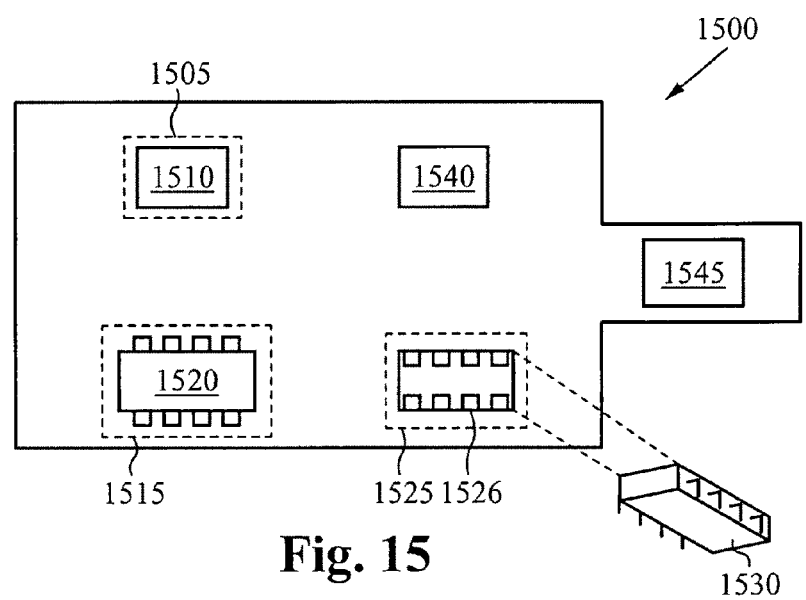
FIG. 15 illustrates a dongle with more than two memories in accordance with some embodiments.

Accordingly, FIG. 15 illustrates that the dongle 1500 of some embodiments further includes additional loci, such as a third locus 1525, and additional memories, such as a third memory 1530. Preferably, the third locus has a socket 1526 such that the third memory 1530 is positioned within, and/or is removable from, the third locus 1525. In these embodiments, the third memory 1530 is typically a non volatile random access type memory (RAM) such as an EEPROM. Similar to the second memory 1520, data are often written to the third memory 1530 at the time of manufacture and the pre-written data are not typically available to a user through a conventional file system on the electronic device. Instead, the data for the third memory 1530 is preferably hidden from the user and operating system of the electronic device.

As described above, in some embodiments, a startup application stored in the first memory 1510 is loaded and/or executed on the electronic device and is enabled to access the third memory 1530 by using non-standard features that are customized for the controller 1540. Further, as described above in relation to the second memory 1520, the third memory 1530 is selectable and/or configurable to provide an additional functionality for the dongle 1500. For instance, the third memory 1530 of some embodiments is preconfigured for a specified functionality, and when the particular preconfiguration is selected, and inserted into the socket 1526, the third memory 1530 provides the particular specified functionality. Alternatively, the third memory 1530 is programmed and/or reprogrammed, while inserted or while removed, to provide the additional functionality.

In some cases, when both the second memory 1520 and the third memory 1530 are present and/or inserted, data in the third memory 1540 is not used directly. Instead, the data in the third memory 1530 is duplicated either in the first or second memories 1510 and 1520, or in a portion of the controller 1540, for use by the dongle 1500. The third memory 1530 of these embodiments can then be removed, while the dongle 1500 advantageously retains and uses the additional functionality provided by the third memory 1530. Alternatively, data in both the second memory 1520 and the third memory 1530 are directly accessed and/or used, for example, by the controller 1540.

While the second and third memories 1520 and 1530 discussed above have been primarily described as read only memories that are programmed at time of manufacture, alternative embodiments include memories that are field programmable. For instance, in a particular embodiment, the controller 1540, and the first, second, third (1510, 1520, 1530), and/or any additional memories are implemented on a single semiconductor device or chip. In this implementation, the memories are typically not removable, and instead it is preferable that one or more memories and/or another element of the semiconductor device are optionally field programmable. In a further additional embodiment, one or more functionalities are embedded into a single chip such as the controller described above. These embodiments are preferably produced and sold without preinstalled and/or preconfigured additional memories such as the second and/or third memories, at reduced cost. Additional functionalities are separately selected, purchased, and/or installed by a user for incremental additional cost.

In an alternative embodiment, the apparatus or dongle does not require additional physical memories beyond the first memory. For instance, in a particular embodiment, the first memory stores a file system and data, together or separately, by using partitions, for example. As described above, particular embodiments embed the first memory within another structure such as the controller. The controller of these embodiments is configured to provide automatic recognition of the apparatus and mounting of the file system from the first memory to the electronic device by using the connector when the apparatus interfaces with the electronic device. Data for automatic navigation to a predetermined location are preferably stored in the first memory, by using one or more partitions. Hence, in this implementation, the first memory is configured to provide a functionality for the apparatus, and the apparatus is preferably configured for automatic execution of an element of the file system, such as the stored functionality, in the one or more partitions.

B. Kiosk

In an embodiment, the dongle is coupled with one or more logistically positioned networked electronic devices, such as at one or more kiosks at a location of interest. By virtue of the coupling, the particular dongle navigates through the network to a predetermined site, where a server preferably registers and/or logs the coupling of the dongle. Typically, to the server, the dongle is uniquely identified by using its security code. The information has a number of advantageous applications. For instance, the server tracks attendance at a specific event or venue, such as Disneyland, for example, or the entry into the individual rides at the Disneyland venue. The information is further used for a number of marketing purposes, or provided to the user of the dongle to view attendance at kiosk venues, or particular rides. Regardless of purpose, the logging or other information associated with the coupling of the dongle at various venues is preferable managed by the server of these embodiments, such that the dongle retains its low cost, small size, simplicity, and/or ease of use.

Figure 16:
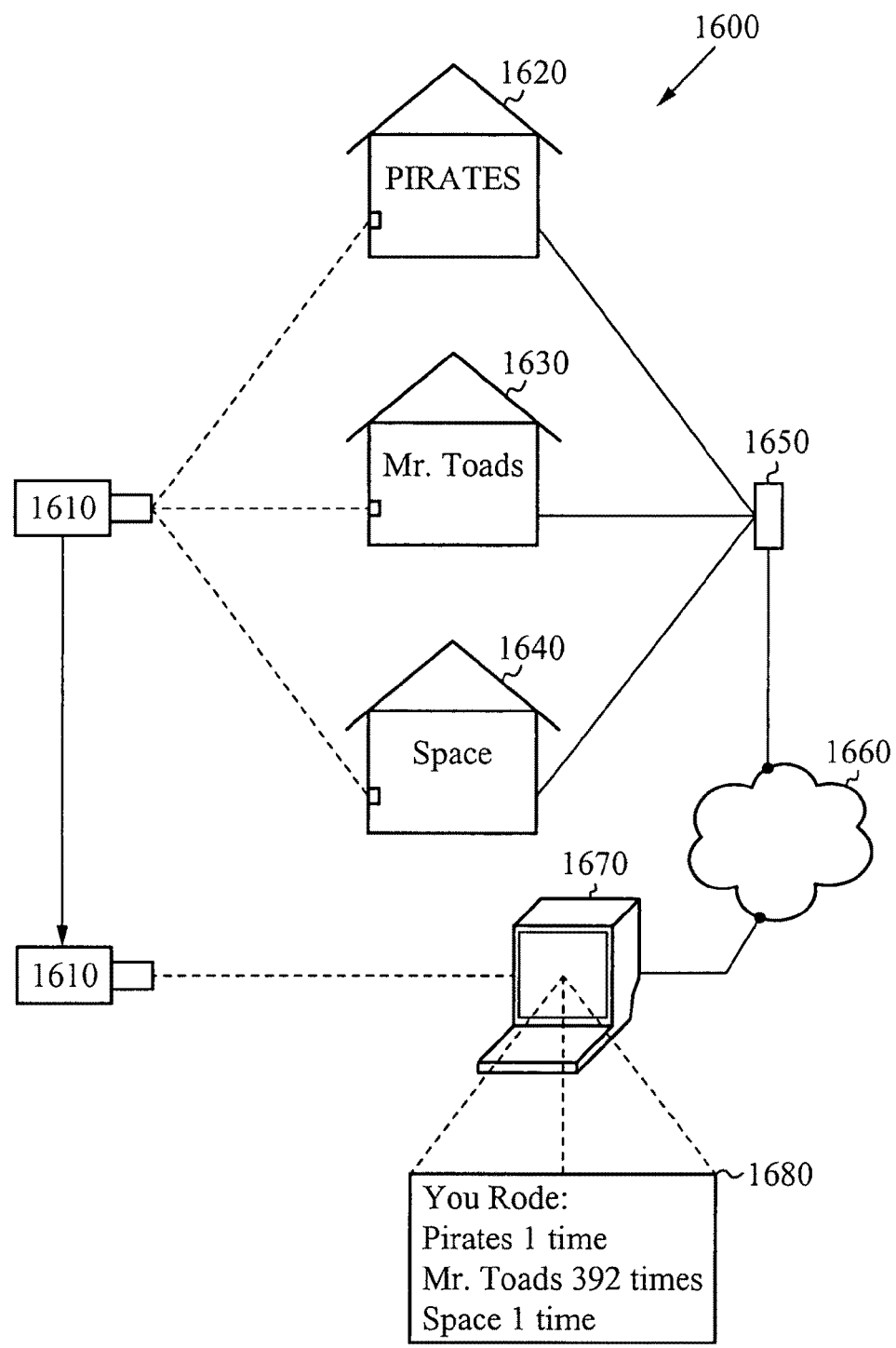
FIG. 16 illustrates a kiosk and vendor type relationship in accordance with some embodiments.

FIG. 16 illustrates an exemplary system 1600 for such an embodiment. As shown in this figure, a user of a dongle 1610, inserts it at a kiosk receiver provided at different venue locations 1620, 1630, and 1640. The venue locations, which in this case are the amusement park rides 1620, 1630, and 1640, are coupled to a server 1650, which is coupled to an Internet 1660. In one embodiment, the server 1650 logs each time the user inserts the dongle 1610 at a kiosk. When the user returns home after visiting the venue, the user inserts dongle 1610 into the user's personal computer 1670, which is also coupled to the Internet 1660. In this embodiment, the user's dongle 1610 auto launches and/or navigates to a location on server 1650 which provides a user interface screen 1680 to the user. Also shown in this embodiment, the user interface screen 1680 displays to user the amount of rides taken, for example, on Mr. Toad's ride 1630.

Additional uses of such information is recognized by one of ordinary skill. For instance, an operator of venue locations 1620, 1630, and 1640 and/or server 1650 advantageously uses the information for marketing and/or promotional purposes. Alternatively, the dongle 1610 of some embodiments is used to control access to rides rather than count rides. For instance, the user purchases a desired number of rides by coupling the dongle 1610 to a kiosk location or the electronic device 1670. The user then couples the dongle 1610 at a specific ride such as Mr. Toad's 1630, for example, where the server 1650 recognizes and/or decrements the number of available remaining purchased rides for the particular dongle 1610. Accordingly, the user is granted access to the ride as many times as the server 1650 determines has been authorized and/or purchased for the particular dongle 1610. Once the number of rides purchased, 394 for example, have been used, the dongle 1610 must be replenished. In this instance, the purchased and/or authorized allotment is used by riding Pirates one time, Mr. Toads 392 times, and Space one time.

Figure 13:
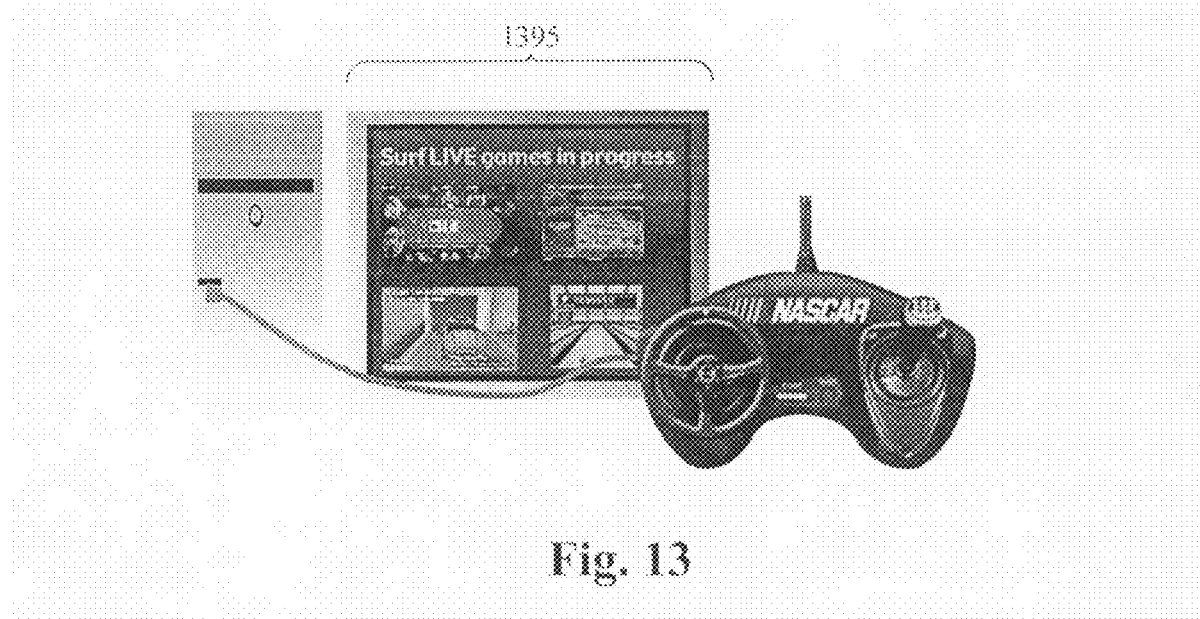
FIG. 13 illustrates the preview feature of some embodiments.

One of ordinary skill recognizes that the credit system described above in relation to FIG. 16 is conveniently combined with the separately purchased removable memories discussed in relation to FIGS. 13, 14 and 15. Hence, a purchaser of credits for storage and/or use on a dongle advantageously performs such a transaction online as described above, or alternatively, by purchasing and then inserting additional and/or replacement memory preconfigured with such credit in one or more sockets of the dongle, for later use at a selected venue.

C. Merchant Transactions

Some embodiments further facilitate retail vending in the form of a gift card type service. As mentioned above, the dongle is typically sold in a conventional retail transaction, without the need for a large amount of personal or financial information, such as in a cash sale, for example. The dongle of some of these embodiments, instead of automatically navigating to a gaming type site, automatically directs the user to an online merchant site for the sale of goods or services. At this site, some implementations further identify a cash and/or credit value for the unique identifier code of the dongle. Accordingly, the value associated with the particular dongle is credited to the merchant in exchange for the sale of goods or services. Preferably, the identified value relevant to the dongle is managed by a server that is remote from the user of the dongle and the merchant. To realize the advantages of automated recognition, mounting, and/or navigation provided by the dongle, the described transaction preferably occurs through an online merchant site. However, one of ordinary skill recognizes that the merchant or vendor of some embodiments is a located at a conventional point-of-sale or physical venue such as a retail store, and/or a kiosk location, as described above.

D. Additional Processes

Figure 17:
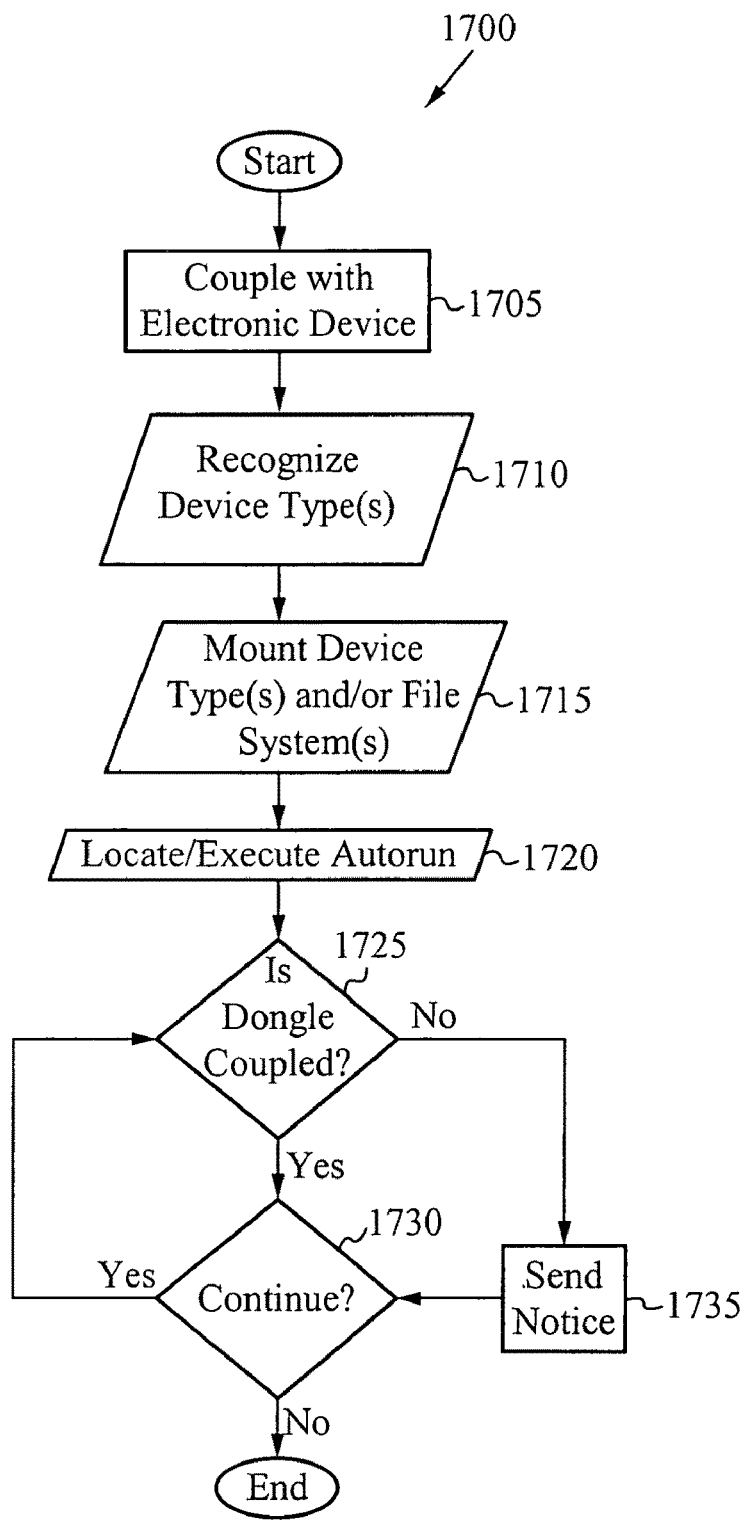
FIG. 17 is a process flow that illustrates the operation of a dongle according to some embodiments.

FIG. 17 illustrates a process 1700 for the operation of a dongle, in accordance with some embodiments. As shown in this figure, the process 1700 begins at the step 1705, where the dongle is coupled with an electronic device. Then, the process 1700 transitions to the step 1710, where an operating system of the electronic device recognizes the dongle as a device type other than the actual device type. In some embodiments, the configuration details are masked from the operating system such that the first memory (ROM 425 in FIG. 4) emulates a particular device such as removable storage or a CD-ROM device.

Next, the process 1700 transitions to the step 1715, where a file system on the dongle is located and mounted. Preferably, the dongle is mounted as a CD type media. After the device type and file system are mounted, the process 1700 transitions to the step 1720 where an autorun algorithm is located and/or executed. As mentioned above, the autorun algorithm can perform a variety of tasks. For example, the autorun algorithm of some embodiments is based on an external installation model, a hard coded download model, an EEPROM based download model, or provides for an execution of a remote program. Exemplary autorun algorithms for each of these tasks and/or models are described below in relation to FIGS. 18, 19, 20 and 21, respectively.

The process 1700 of some embodiments concludes after the location and/or execution of an autorun algorithm. Alternatively, the process 1700 of some embodiments transitions to the step 1725, where it is determined whether the dongle is, or remains, coupled with the electronic device. Some embodiments use a polling algorithm to determine whether the dongle remains coupled. For instance, if the dongle is coupled with the electronic device at the step 1725, the process 1700 transitions to the step 1730, where it is determined whether the process 1700 should continue. For instance, the user wishes to stop the process 1700, or the autorun algorithm or another algorithm started by the autorun algorithm, indicates that the process 1700 should stop, though the dongle remains coupled. If at the step 1730, it is determined that the process 1700 should continue, then the process 1700 returns to the step 1725, otherwise the process 1700 concludes after the step 1730.

If, however, at the step 1725, it is determined that the dongle is decoupled from the electronic device, then the process 1700 transitions to the step 1735, where a notice is sent to the user and/or a functionality is disabled. For instance, some embodiments send a notice to the user indicating that the dongle has been decoupled and requests that the dongle be re-coupled. Some embodiments may query the user whether the dongle is available and/or if the user wishes to continue, such as at the step 1730. If it is indicated that the dongle is no longer available and/or that the user no longer wishes to continue, some embodiments close and/or terminate any windows, algorithms, and/or processes that were started or associated with the process 1700 or the autorun algorithm. For instance, some embodiments terminate an automatically launched browser application associated with the autorun algorithm. As described above, if the process 1700 should continue at the step 1730, then the process 1700 returns to the step 1725, otherwise the process 1700 concludes.

Also discussed above, a variety of tasks are optionally performed by the autorun algorithm of different embodiments. For instance, preferably the autorun algorithm provides an authentication procedure for the dongle. Typically, the authentication procedure includes a remote program that must first be located and/or retrieved.

1. External Install Autorun

Figure 18:
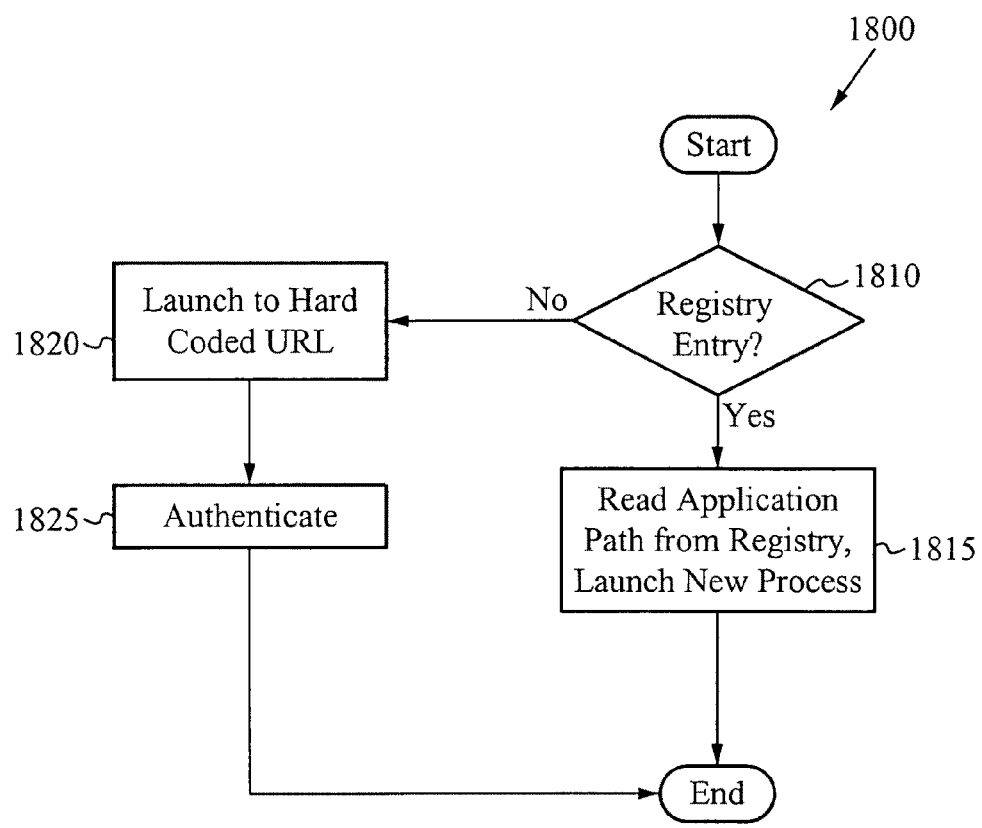
FIG. 18 illustrates process steps for an external installation of a remote program where the external location is hard coded.

FIG. 18 illustrates an exemplary autorun algorithm that is particularly based on an external installation model for the remote program. As shown in this figure, the process 1800 begins at the step 1810, where a registry is checked for the authentication program. In this embodiment, the registry is preferably a system registry for the electronic device. For instance, some operating systems have a system registry that logs tracking information for programs that are installed and/or are known to the operating system. The registry check determines whether an entry is present in the registry of the electronic device for the specific program. If an entry for the authentication program is present in the registry of the electronic device, the process transitions to the step 1815, where a location path for the authentication program is read. Typically, the location path designates a local source for the authentication program, and once located, the authentication program is preferably launched as a new system thread and/or process by the operating system. The authentication procedure preferably employs the hidden information on the dongle such that its activities are transparent, and typically require no interaction or information from the user.

After authentication proceeds at the step 1815, the process 1800 concludes. If, however, at the step 1810, an entry for the authentication program is not located in the registry of the electronic device, then the process 1800 transitions to the step 1820, where a browser automatically launches with a remote location for authentication. Preferably, the source location is a URL stored and/or hard coded in the dongle's memory. In some embodiments, the hard coding is in the first memory and/or masked ROM of the dongle. This memory is typically not removable, swappable, and/or accessible except by using the controller. Accordingly, this embodiment is typically hard coded to the first memory at manufacture and updating, if permitted, requires an additional reprogramming process for the hard coded information. Similarly, the autorun algorithm of these embodiments, is typically hard coded to the first memory at manufacture, as well.

Once the location is found and/or launched at the step 1820, the process 1800 transitions to the step 1825, where authentication occurs. In some embodiments, the authentication occurs directly at the remote location without further downloading and/or installation steps. For instance, some embodiments employ a scripting language to support this function. Then, after the step 1825, the process 1800 concludes.

Figure 21:
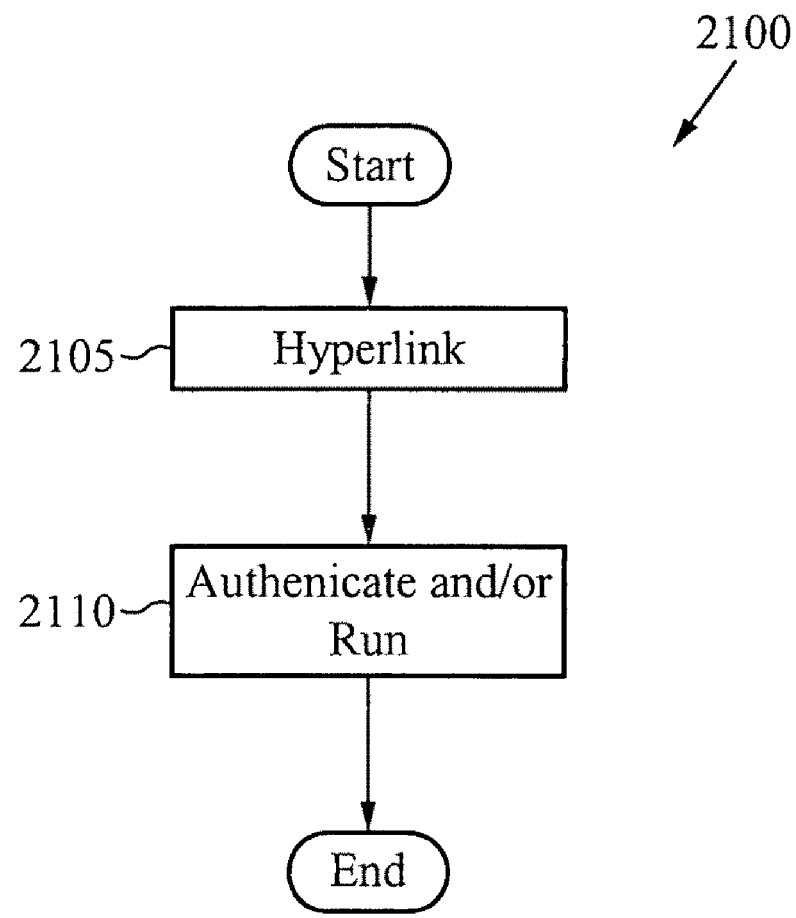
FIG. 21 illustrates a process for online access of a remote program according to some embodiments of the invention.

Alternatively, some embodiments of the autorun algorithm hyperlink, authenticate, and/or run an online application without additional checking and/or downloading. Such an embodiment is illustrated in FIG. 21. As shown in this figure, the process 2100 begins at the step 2105, where the dongle hyperlinks to a URL stored and/or hidden by the dongle. The hyperlinking is typically automatic and transparent upon coupling of the dongle to a networked electronic device. After the dongle hyperlinks to the URL at the step 2105, the process 2100 transitions to the step 2110, where an authentication occurs. Typically, authentication includes identification by the dongle to a remote server at the URL by using the hidden security code stored on the dongle. For instance, in some embodiments an authentication program is run directly with the hyperlinked URL, and/or additional applications begin running at the local and/or remote locations to provide content to the user. Then, the process 2100 concludes.

2. Hard Coded Download Autorun

Figure 19:
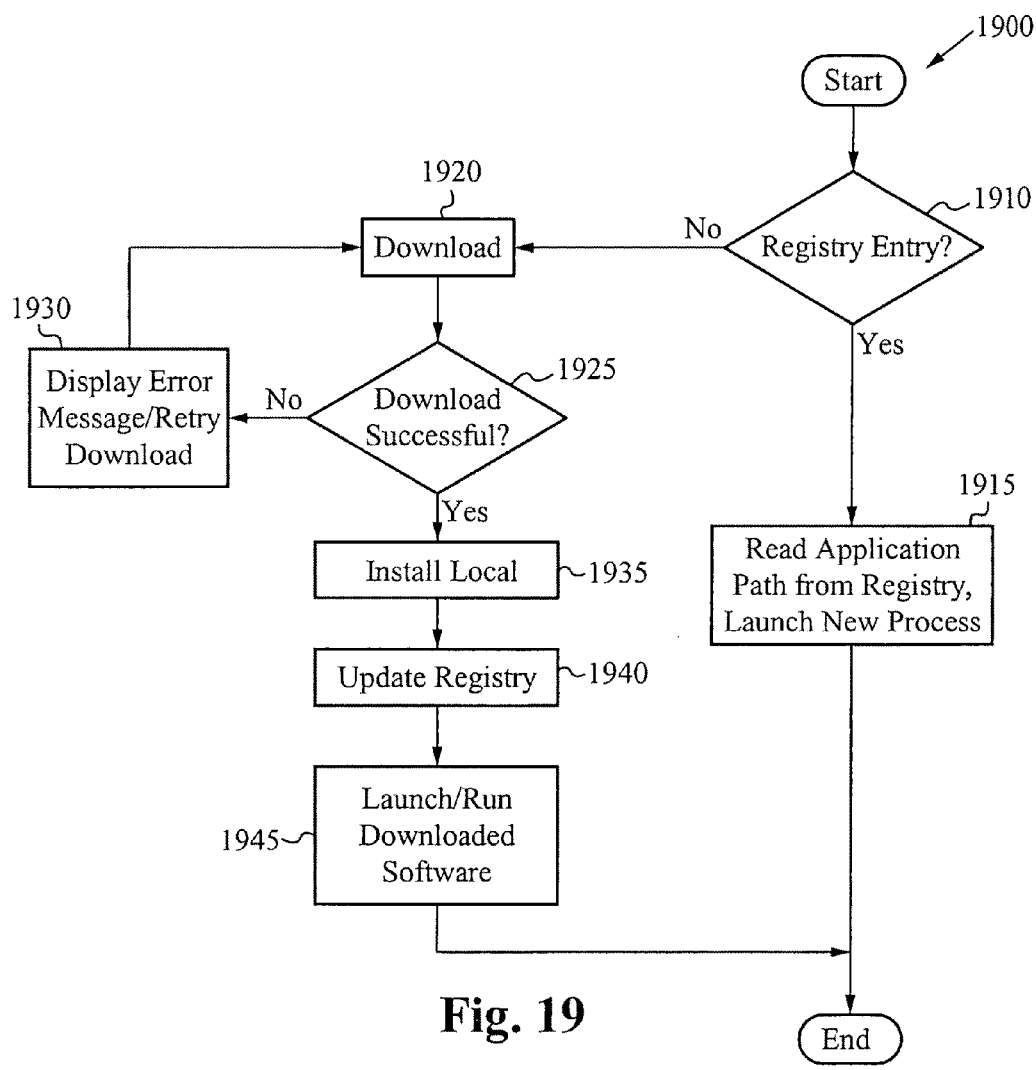
FIG. 19 illustrates process steps for a download of a remote program where the location is hard coded.

FIG. 19 illustrates an autorun algorithm 1900 that includes a hard coded download model. As shown in this figure, the process 1900 begins at the step 1910, where a registry is checked for an authentication program entry. If an entry is present in the registry, the process 1900 transitions to the step 1915, where a location path for the authentication program is read. Typically, the registry entry specifies a local path for the authentication program, and once located, the authentication program is preferably launched as a new system thread and/or process.

After the step 1915, the process 1900 concludes. If, however, at the step 1910, no entry is found in the registry, then the process 1900 transitions to the step 1920, where the authentication program is downloaded to the electronic device. Typically, the download site is hard coded to a masked and/or hidden location in the dongle's memory. For instance, in some embodiments, the source location is hard coded along with the autorun algorithm to the first memory, at the time of manufacture.

Then, the process 1900 transitions to the step 1925, where it is determined whether the download is successful. If the download is unsuccessful, the process 1900 transitions to the step 1930, where an error message is displayed, and/or the process 1900 transitions to the step 1920, where the download is attempted again. Alternatively, if the downloaded is unsuccessful, the error message includes an option to quit the download whereby the process 1900 concludes.

If, however, at the step 1925, the downloaded is successful, the process 1900 transitions to the step 1935, where the downloaded program is installed onto the electronic device. Then, the process 1900 transitions to the step 1940, where the registry on the electronic device is updated with an entry for the successfully downloaded and/or installed authentication program. Typically, this allows additional launches of the dongle and/or the authentication program to execute faster. Once installation occurs, the process 1900 transitions to the step 1945, where the installed program is launched and/or authentication occurs. After the step 1945, the process 1900 concludes.

3. EEPROM Based Download Autorun

Figure 20:
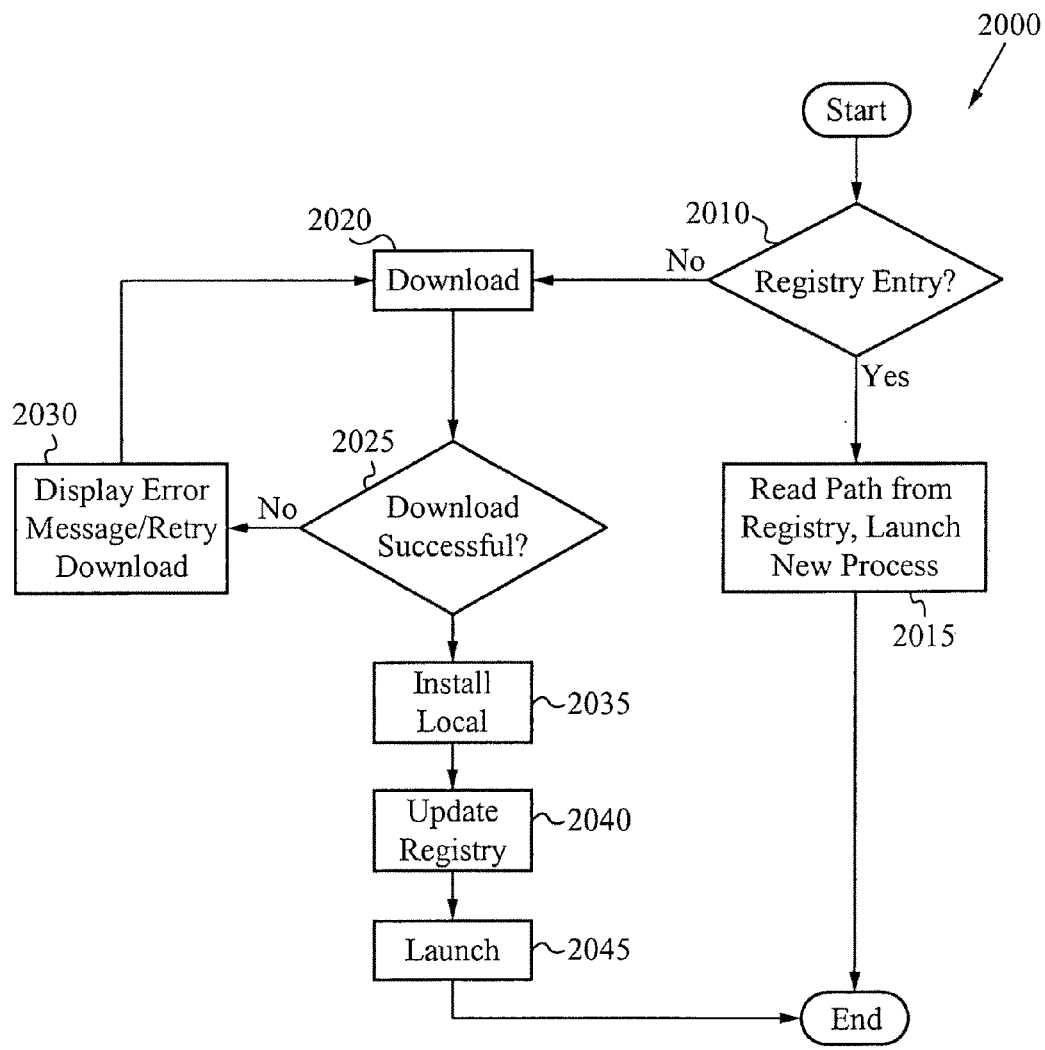
FIG. 20 illustrates process steps for a download of a remote program where the location is not hard coded, in accordance with some embodiments.

FIG. 20 illustrates an alternative autorun algorithm 2000 that is based on a download model for the memory of a dongle, such as an EEPROM, for example. In accordance with the embodiments described above, these memories typically include the second, third, or other memories of the dongle, and these embodiments further preferably include sockets such that the memories are removable for changing and/or adding functionalities for the dongle. As shown in FIG. 20, the process 2000 begins at the step 2010, where a registry is checked for an authentication program. Some embodiments further read the registry value at the step 2010, from the second memory for instance.

If, at the step 2010, an entry is present in the registry, the process 2000 transitions to the step 2015, where a location path for the authentication program is read and/or is typically launched as a new system thread and/or process, from a local path. After the step 2015, the process 2000 concludes.

If, however, at the step 2010, the entry is not present in the registry, the process 2000 transitions to the step 2020, where the authentication program is downloaded from a remote location. In some embodiments, the source location is specified in the hidden portion of the second, third, or another (n-th) memory. For instance, in some embodiments the second memory comprises a removable EEPROM, and the source location includes a URL, which is stored in a hidden portion of the dongle's second memory EEPROM. As mentioned above, the EEPROM of these embodiments provides an inexpensive, removable, swappable, and/or field programmable means to supply additional functionalities to the dongle, such as, for example, additional source locations. Similarly, one of ordinary skill recognizes that a third or an n-th memory is advantageously utilized to provide further locations and/or functionalities.

Once the authentication program is located and retrieved by using the hidden memory at the step 2020, the process 2000 transitions to the step 2025, where it is determined whether the download was successful. If the download is unsuccessful, the process 2000 transitions to the step 2030, where an error message is displayed, and/or the process 2000 transitions to the step 2020, where the download is attempted again. Alternatively, if the download is unsuccessful, some embodiments display an error message with an option to cancel the download thereby concluding the process 2000.

If, however, at the step 2025, the download is successful, the process 2000 transitions to the step 2035, where the downloaded program is installed on the electronic device. Then, the process 2000 transitions to the step 2040, where the registry is updated to reflect the successful retrieval and/or installation of the authentication program. In some embodiments, this improves the performance for later launches of the dongle and/or the autorun algorithm. Once the program is downloaded, installed, and/or registered, the process 2000 transitions to the step 2045, where the installed program is launched and/or authentication proceeds. After the step 2045, the process 2000 concludes.

One of ordinary skill appreciates variations to the exemplary autorun algorithms described above. For instance, as mentioned above, some embodiments forego the step of checking a registry and instead hyperlink immediately to a remote location. Moreover, some embodiments forego some downloaded information and instead rely more heavily upon remote execution and/or scripting protocols. An example of such an embodiment is described in relation to FIG. 21.

E. Directed Navigation

1. Browser Wrapper

In the implementations where a browser application is automatically launched, the browser's navigation bar is preferably removed such as, for example, by using an Active-X control or wrapper, to limit the functions of the browser application. As is understood by one of ordinary skill, a conventional navigation bar typically has navigation buttons and a location field. Hence, when the browser application is launched without the navigation bar, a user is prevented or discouraged from navigating to another location other than the specified default URL, since the user cannot specify a different URL without the location field. Some embodiments employ additional means to reduce or limit the navigation of a user once the user has been automatically directed to particular content.

Further, some embodiments permit the user to launch a separate browser application and/or process for normal navigation while the automatically launched browser is running, or at other times, such as not during the time of execution of the automatically launched browser application. For instance, in some embodiments, if a browser is not automatically launched but is manually launched by the user, the browser's navigation bar is not removed. In these embodiments, the browser application, that is automatically launched by the dongle, does not affect navigation in other browser applications and/or processes that are separately or manually launched by the user.

2. Server Directed Navigation

Separately, or in conjunction with the browser wrapping described above, some embodiments direct the navigation of a user by using a server. For instance, when a dongle is recognized by the server, the server applies a white list to the electronic device coupled with the dongle. The white list includes a set of web sites that the electronic device is permitted to navigate, for the time that the dongle is coupled. For instance, a dongle is configured to provide access to the Nickelodeon® web site hosted by the Disney corporation. When the dongle for Nickelodeon access is coupled to a networked personal computer and identifies itself to the server, through the network, the server provides a white list to the personal computer based on the identification. In this case, the white list comprises a set of Nickelodeon sites selected for the dongle such that the personal computer is permitted navigation to only sites on the white list.

The server of some embodiments polls the presence of the dongle, and enforces the white list for the personal computer, as long as the dongle is present. One of ordinary skill recognizes variations in the implementation of such a feature. For instance, alternative embodiments employ a black list that includes a set of forbidden sites that are barred from navigation, while the presence of the dongle is detected.

F. Network Security

Some embodiments provide for higher security online access, for example, by using a secured network connection. More specifically, particular implementations advantageously transfer data through a secure socket layer (SSL), and via the secure hyper text transfer protocol (HTTPS). Alternatively, or in conjunction with these SSL implementations, in some embodiments an encryption channeling protocol is implemented on the dongle for securing content transfer. With conventional secure content transfers, the encryption channeling protocol is typically installed at both the client side on the electronic device, and at the server side.

In comparison, some embodiments enable the encryption channeling protocol on the dongle, which ensures secure content transfer each time content is transferred from the dongle to the server side. In these embodiments, the encryption channeling protocol is advantageously available by virtue of the dongle, regardless of the particular electronic device to which the dongle is coupled. Hence, the dongle of these embodiments provides a convenient, portable, and physically secure means for enabling secure content transfer from the client side to the server side. For instance, in a particular embodiment, the hardware dongle enables secure transfer of second memory contents to the server side through the client electronic device.

V. Advantages

In contrast to the plug and play television games described above, most consumer/players already have a personal computer in their homes. These computers tend to be compatible with a wide selection of software titles, including games, of the retail store "box" variety, the download distribution channel variety, or both. Moreover, many computers are already networked and capable of accessing online content and communities. It is currently estimated that a significant portion of the online content and gaming community, approximately 85% of teen and pre-teen aged children ("tweens"), have in-home Internet access. By 2006, it is expected that 50% of tweens will have online access in their bedrooms. As is known in the art, most tweens do not have access to conventional security verification and payment means such as credit cards. Moreover, many prospective online content users in general prefer not to reveal this information online. It would be useful to these consumers for a method and means of accessing content, particularly related to an online community, without revealing personal and financial data, and without the need for sophisticated navigation.

Accordingly, some embodiments of the invention provide for content distribution, such as game distribution, in an alternative hardware/software format, for example, that plugs directly into a personal computer or other suitable electronic device. These embodiments facilitate the delivery of content to the average consumer. For instance, embodiments of the invention provide online access to games and content to the mass market consumer through retail channels. Historically, these consumers were required to navigate to a complex location in cyberspace to reach the content. Moreover, once the consumer reached the appropriate location, the consumer was often further required to enter sensitive personal and/or financial information. As described above, certain embodiments of the invention promote access to secured online content by reducing the requisite amount of navigation skill and secure data for access.

Opening the door to the online communities provides new opportunities to these enabled users. In the gaming realm, online players are provided links to online leader boards to show global rankings for players from around the world. For instance, some embodiments provide a unique "Game Surf" button that allows anyone within any of the games to view current high scores and demos of progress in relationship to the other participants' activities. An exemplary implementation of the Game Surf preview 1395 is illustrated in FIG. 13. Similarly online multi player games provide real time head to head competition across the world. The potential for online games is virtually limitless, from auto racing such as "Indy" and "NASCAR" type events to online card games.

Moreover, the online community extends beyond game play. An online community is often a place where millions of people, often with previous conventional secure access constraints (credit cards), go to play games, compete, see new available content, watch advertisements and make purchases. Further, users obtaining secure access often communicate through a variety of real time means, including voice and text "chat" modes. Online users participate in group activities including trading of online decks of collectibles such as character cards that are often used in conjunction with other activities such as game play.

For example, some embodiments of the invention provide for easier online shopping for users. In these embodiments, the dongle serves as a virtual gift voucher for a particular vendor. With a traditional gift card, a gift card holder must manually launch a web browser, enter the vendor's URL in the browser to access the vendor's website, and check out by entering the gift card number. With the present invention, when the dongle is connected to the electronic device, the browser is automatically launched, which automatically takes the user to the vendor website, and the voucher amount is automatically deducted from the total purchase price during check out.

In addition to providing greater and more high quality services for the user, the implementations describe above also provide additional marketing opportunities for companies. For instance, a company can directly send tailored marketing content, product information, or promotions via the web browser to the user based on the user's activity, the information stored on the dongle, and/or the information stored for the dongle on a server. As described above, the portable identifier and/or security information stored on the dongle logs the user into the company's server. Accordingly, this new form of communication allows the company to be proactive for the delivery or receipt of content to and from a targeted audience.

Further, the hybrid hardware/software and local/online implementations described above are providing greater and more high quality services for the user such as graphics that include 16 to 32 bit images and 3D rendering. These games often interconnect through the network in a plug-and-play like fashion, as described above. However, also unlike the television plug-and-play game consoles mentioned above, game purchases are a discrete relationship for the consumer, which provides a pre-paid pass to an online network gateway that is easily obtained through a familiar secure retail channel. For manufacturers, the hardware implementation of some embodiments provides a proprietary low-cost technology that automatically and securely connects customers to the online (pushed) content. These embodiments further permit manufacturers to license a broad range of products in a variety of markets including games, collectible toys, electronic pets, online trading cards, vehicles, and digital media, for example.

While the invention has been described with reference to numerous specific details, one of ordinary skill in the art will recognize that the invention can be embodied in other specific forms without departing from the spirit of the invention. For instance, the invention has been described primarily in relation to online gaming networks. However, one of ordinary skill will recognize additional implementations such as local gaming and online membership and/or subscription services for content that includes magazines, music, movies, and other media ("e-pets in an e-lifestyle"). As another example, while the embodiments described above include a variety of implementation level details, such as the variations involving a single-chip with onboard memory (and no external memory), and the alternative variations employing a first, second, third, and/or multiple additional memories, some of these variations are readily recognized as equivalent in terms of physical and/or logical structure. As mentioned above, one or more of the first, second, and third memories are optionally implemented as separate logical partitions within the same chip and/or within more than one physical chip or structure. Thus, one of ordinary skill in the art will understand that the invention is not to be limited by the foregoing illustrative details, but rather is to be defined by the appended claims.

What is claimed is:

1. An apparatus configured for communication with an electronic device, the apparatus comprising:
   a connector for interfacing with the electronic device;
   a controller for controlling the interface between the connector and the electronic device;
   a first memory comprising a file system, wherein the controller is configured to provide automatic recognition of the apparatus and mounting of the file system to the electronic device by using the connector when the apparatus interfaces with the electronic device;
   a second memory having data for automatic navigation to a predetermined location, wherein the apparatus is configured for automatic execution of an element of the file system upon the connector coupling to the electronic device;
   a first locus for the first memory, wherein the first memory is positioned by using the first locus; and
   a second locus for the second memory, wherein the second memory is positioned by using the second locus, wherein the second memory is configured to provide a functionality for the apparatus, wherein the second locus is configured such that the second memory is removable from the second locus.

2. The apparatus of claim 1, wherein the second memory comprises a plurality of configurations, each configuration having a user selectable functionality, wherein when the second memory is replaced by using an alternate configuration for the second memory, an alternate functionality is selected.

3. The apparatus of claim 1, wherein the second memory comprises a removable EEPROM, wherein the second locus comprises a socket for the removable EEPROM.

4. The apparatus of claim 1, further comprising a third memory, the third memory configured to provide an additional functionality for the apparatus.

5. The apparatus of claim 1, further comprising a third locus for the third memory, the third locus configured such that the third memory is removable from the third locus.

6. The apparatus of claim 5, wherein the third memory is positioned within the third locus.

7. The apparatus of claim 5, wherein the third locus comprises a socket.

8. The apparatus of claim 1, wherein the apparatus is configured to emulate a different device type other than an actual device type such that the apparatus is mounted as the different device type on the electronic device.

9. The apparatus of claim 1, the apparatus configured to retrieve a program.

10. The apparatus of claim 9, further comprising a registry, the registry configured to indicate whether the program is retrieved, wherein the program is retrieved for the electronic device.

11. The apparatus of claim 9, the apparatus configured to retrieve the program by using the second memory, wherein a portion of the second memory is hidden from an operating system of the electronic device.

12. The apparatus of claim 1, wherein the functionality comprises a link to a first set of content.

13. The apparatus of claim 1, wherein the functionality comprises one or more credits.

14. A method of interfacing with an electronic device, the method comprising:
   coupling to the electronic device by using a connector;
   controlling the interface between the connector and the electronic device;
   retrieving from a first memory a stored file system, thereby forming a retrieved file system;
   providing the retrieved file system to the electronic device by using the connector;
   automatically recognizing the file system when the connector interfaces with the electronic device;
   automatically executing an element of the file system upon the connector coupling to the electronic device; and providing a functionality by using a second memory that is removable from a second locus, wherein the providing step includes automatically navigating to a predetermined location.

15. The method of claim 14, wherein the second memory comprises a plurality of configurations, each configuration having a user selectable functionality, such that when the second memory is replaced by using an alternate configuration for the second memory, an alternate functionality is selected.

16. The method of claim 14, further comprising providing an additional functionality by using a third memory.

17. The method of claim 14, further comprising selecting an alternative functionality by replacing the third memory.

18. The method of claim 14, further comprising emulating a different device type other than an actual device type.

19. The method of claim 14, further comprising retrieving a remote program.

20. The method of claim 14, further comprising hiding a portion of the second memory.

21. The method of claim 14, further comprising determining whether a program is downloaded.

22. The method of claim 14, further comprising running a retrieved program.

23. The method of claim 14, the functionality further comprising a link to a first set of content.

24. The method of claim 14, the functionality further comprising one or more credits.

25. An apparatus configured for communication with an electronic device, the apparatus comprising:
a connector for interfacing with the electronic device;
a controller for controlling the interface between the connector and the electronic device;
a first memory comprising a file system, wherein the controller is configured to provide automatic recognition of the apparatus and mounting of the file system to the electronic device by using the connector when the apparatus interfaces with the electronic device; and
a second memory having data for automatic navigation to a predetermined location and prevents navigation to another location, wherein the apparatus is configured for automatic execution of an element of the file system upon the connector coupling to the electronic device.

26. An apparatus configured for communication with an electronic device, the apparatus comprising:
a connector for interfacing with the electronic device;
a controller for controlling the interface between the connector and the electronic device;
a first memory comprising a file system, wherein the controller is configured to provide automatic recognition of the apparatus and mounting of the file system to the electronic device by using the connector when the apparatus interfaces with the electronic device; and
a second memory having data for automatic navigation to a predetermined location wherein the apparatus is configured for automatic execution of an element of the file system upon the connector coupling to the electronic device and further wherein the apparatus configured for a first launch and a second launch, wherein the first launch occurs when the apparatus is initially coupled to the electronic device and the electronic device stores an application, wherein the second launch is subsequent the first launch, such that the second launch is faster than the first launch.

27. An apparatus configured for communication with an electronic device, the apparatus comprising:
a connector for interfacing with the electronic device;
a controller for controlling the interface between the connector and the electronic device;
a first memory comprising a file system, wherein the controller is configured to provide automatic recognition of the apparatus and mounting of the file system to the electronic device by using the connector when the apparatus interfaces with the electronic device; and
a second memory having data for automatic navigation to a predetermined location and prevents navigation to another location, wherein the apparatus is configured for automatic execution of an element of the file system upon the connector coupling to the electronic device such that when the apparatus is decoupled from the electronic device, a functionality is disabled.

28. A method of interfacing with an electronic device, the method comprising:
coupling to the electronic device by using a connector;
controlling the interface between the connector and the electronic device;
retrieving from a first memory a stored file system;
providing the retrieved file system to the electronic device by using the connector;
automatically recognizing the file system when the connector interfaces with the electronic device;
automatically executing an element of the file system upon the connector coupling to the electronic device;
using data from a second memory, thereby automatically navigating to a predetermined location; and
storing an application on the electronic device such that a second launch is faster than a first launch.

29. A method of interfacing with an electronic device, the method comprising:
coupling to the electronic device by using a connector;
controlling the interface between the connector and the electronic device;
retrieving from a first memory a stored file system;
providing the retrieved file system to the electronic device by using the connector;
automatically recognizing the file system when the connector interfaces with the electronic device;
automatically executing an element of the file system upon the connector coupling to the electronic device;
using data from a second memory;
retrieving a set of predetermined locations, thereby automatically navigating to a location within the set; and
preventing navigation to a location that is not within the set.

30. A method of interfacing with an electronic device, the method comprising:
coupling to the electronic device by using a connector;
controlling the interface between the connector and the electronic device;
retrieving from a first memory a stored file system;
providing the retrieved file system to the electronic device by using the connector;
automatically recognizing the file system when the connector interfaces with the electronic device;
automatically executing an element of the file system upon the connector coupling to the electronic device;
using data from a second memory that is removable from a second locus, thereby automatically navigating to a predetermined location;
determining that the connector is disconnected; and
disabling a functionality in response thereto.

31. An apparatus configured for communication with an electronic device, the apparatus comprising:

a connector for interfacing with the electronic device;
a controller for controlling the interface between the connector and the electronic device;
a first memory having a plurality of partitions, the partitions comprising:
   a file system, wherein the controller is configured to provide automatic recognition of the apparatus and mounting of the file system to the electronic device by using the connector when the apparatus interfaces with the electronic device; and
   data for automatic navigation to a predetermined location, wherein the first memory is configured to provide a functionality for the apparatus, wherein the apparatus is configured for automatic execution of an element of the file system upon the connector coupling to the electronic device.

* * * * *